(12) United States Patent
You et al.

(10) Patent No.: US 12,232,151 B2
(45) Date of Patent: Feb. 18, 2025

(54) OPERATING METHOD FOR IAB NODE IN WIRELESS COMMUNICATION SYSTEM, AND DEVICE USING METHOD

(71) Applicant: LG Electronics Inc., Seoul (KR)

(72) Inventors: Hyangsun You, Seoul (KR); Haewook Park, Seoul (KR); Hyunsoo Ko, Seoul (KR); Jaenam Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 338 days.

(21) Appl. No.: 17/772,070

(22) PCT Filed: Nov. 2, 2020

(86) PCT No.: PCT/KR2020/015117
§ 371 (c)(1),
(2) Date: Apr. 26, 2022

(87) PCT Pub. No.: WO2021/086147
PCT Pub. Date: May 6, 2021

(65) Prior Publication Data
US 2022/0345285 A1 Oct. 27, 2022

(30) Foreign Application Priority Data

Oct. 31, 2019 (KR) .................... 10-2019-0137885
Jan. 14, 2020 (KR) .................... 10-2020-0005002
(Continued)

(51) Int. Cl.
*H04W 72/53* (2023.01)
*H04W 72/0446* (2023.01)
(Continued)

(52) U.S. Cl.
CPC ....... *H04W 72/53* (2023.01); *H04W 72/0446* (2013.01); *H04W 72/23* (2023.01); *H04W 72/29* (2023.01)

(58) Field of Classification Search
CPC ..... H04W 72/53; H04W 72/29; H04W 72/23; H04W 72/0446
See application file for complete search history.

(56) References Cited

U.S. PATENT DOCUMENTS

| 2019/0313433 A1 | 10/2019 | Abedini et al. |
| 2020/0145992 A1 | 5/2020 | Abedini et al. |

(Continued)

FOREIGN PATENT DOCUMENTS

WO 2019194737 10/2019

OTHER PUBLICATIONS

Huawei et al., On resource coordination and dynamic scheduling in IAB, R1-1812201, 3GPP TSG RAN WG1 Meeting #95, Spokane, USA, Nov. 3, 2018, see sections 2-2.2; and figures 1 and 4.
(Continued)

*Primary Examiner* — Chandrahas B Patel
(74) *Attorney, Agent, or Firm* — BRYAN CAVE LEIGHTON PAISNER LLP

(57) ABSTRACT

Provided are an operating method for an IAB node including a DU and an MT in a wireless communication system, and a device. The method receives first resource direction information about the DU and second resource direction information about the MT, wherein each of the first and second resource direction information indicates the direction of each resource as being downlink, uplink or flexible. The IAB node determines, for a certain resource from among the resources, whether the DU and the MT can operate at the same time on the basis of the direction indicated by the first resource direction information and the direction indicated by the second resource direction information.

12 Claims, 40 Drawing Sheets

(30) Foreign Application Priority Data

Feb. 12, 2020 (KR) .......................... 10-2020-0017120
Apr. 1, 2020 (KR) .......................... 10-2020-0039722
Oct. 23, 2020 (KR) .......................... 10-2020-0138107

(51) Int. Cl.
*H04W 72/23* (2023.01)
*H04W 72/29* (2023.01)

(56) References Cited

U.S. PATENT DOCUMENTS

2020/0145997 A1    5/2020  Luo et al.
2021/0321463 A1*  10/2021  Wu .................. H04W 74/0891

OTHER PUBLICATIONS

3GPP; TSG RAN; NR; Study on Integrated Access and Backhaul; Release 16, 3GPP TR 38.874 V16.0.0, Jan. 10, 2019, see sections 7.3-7.3.3; and table 7.3.3-2.
Nokia et al., Mechanisms for resource multiplexing among backhaul and access links, R1-1911194, 3GPP TSG RAN WG1 Meeting #98b, Chongqing, China, Oct. 4, 2019, see section 2; and table 1.

\* cited by examiner

OPERATING METHOD FOR IAB NODE IN WIRELESS COMMUNICATION SYSTEM, AND DEVICE USING METHOD

This application is the National Stage filing under 35 U.S.C. 371 of International Application No. PCT/KR2020/015117 filed on Nov. 2, 2020, which claims priority to Korean Patent Application Nos. 10-2019-0137885 filed on Oct. 31, 2019; 10-2020-0005002 filed on Jan. 14, 2020; 10-2020-0017120 filed on Feb. 12, 2020; 10-2020-0039722 filed on Apr. 1, 2020 and 10-2020-0138107 filed on Oct. 23, 2020, the contents of which are all hereby incorporated by reference herein in their entirety.

BACKGROUND OF THE DISCLOSURE

Field of the Disclosure

The present disclosure relates to a method of operating an integrated access and backhaul (IAB) node including a distributed unit (DU) and a mobile terminal (MT) in a wireless communication system, and an apparatus using the method.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

In NR, massive MIMO or multi-beam may be used, and a very large bandwidth is expected to be available compared to LTE, and the development and deployment of integrated access and backhaul (IAB) nodes is also expected.

An IAB node may be a node that supports a wireless connection with a terminal like a repeater based on a wireless backhaul (connection with a parent node or a donor node) supporting multi-hop. The IAB node may include a distributed unit (DU) and a mobile terminal (MT). Here, the DU may be a part that provides a connection to a terminal or other IAB node, and the MT may be a part that provides a connection to a parent node or a donor node.

Meanwhile, in the discussion of the conventional IAB node, it is assumed that the DU and the MT operate at different times. That is, on the premise of time division multiplexing (TDM) in which only one of DU and MT operates at a specific time, resource allocation for DU and MT has been discussed.

However, in a future system, the DU and the MT of the IAB node may operate simultaneously. Therefore, there is a need for a method of allocating resources for simultaneous operation of DU and MT while considering the resource allocation method for the existing IAB node.

In addition, a method for determining the operation resources of the MT and the DU of the IAB node according to a multiplexing type applicable between the DU and the MT of the specific IAB node is also proposed. When a plurality of component carriers (CCs) exist in the IAB node and the CC of the DU and the MT can have the same/different multiplexing type, a method for determining the operation resources of the MT and the DU of the IAB node is also proposed.

SUMMARY OF THE DISCLOSURE

An object of the present disclosure is to provide a method of operating an IAB node including a DU and an MT in a wireless communication system, and an apparatus using the method.

In one aspect, provided is a method of operating an integrated access and backhaul (IAB) node including a distributed unit (DU) and a mobile terminal (MT) in a wireless communication system. The method includes receiving first resource direction information for the DU, the first resource direction information informing a direction of each of resources as a downlink, an uplink, or a flexible, receiving second resource direction information for the MT, the second resource direction information informing a direction of each of the resources as a downlink, an uplink, or a flexible and for a specific resource among the resources, determining whether the DU and the MT can simultaneously operate based on a direction informed by the first resource direction information and a direction informed by the second resource direction information.

In another aspect, provided is an integrated access and backhaul (IAB) node including a distributed unit (DU) and a mobile terminal (MT). The LAB node includes a transceiver, at least one memory and at least one processor operatively coupled with the at least one memory and the transceiver. The processor is configured to: receive first resource direction information for the DU, the first resource direction information informing a direction of each of resources as a downlink, an uplink, or a flexible, receive second resource direction information for the MT, the second resource direction information informing a direction of each of the resources as a downlink, an uplink, or a flexible and for a specific resource among the resources, determine whether the DU and the MT can simultaneously operate based on a direction informed by the first resource direction information and a direction informed by the second resource direction information.

In still another aspect, provided is an apparatus of an integrated access and backhaul (IAB) node including a distributed unit (DU) and a mobile terminal (MT). The apparatus includes at least one memory and at least one processor operatively coupled with the at least one memory. The processor is configured to: receive first resource direction information for the DU, the first resource direction information informing a direction of each of resources as a downlink, an uplink, or a flexible, receive second resource direction information for the MT, the second resource direction information informing a direction of each of the resources as a downlink, an uplink, or a flexible and for a specific resource among the resources, determine whether the DU and the MT can simultaneously operate based on a direction informed by the first resource direction information and a direction informed by the second resource direction information.

In still another aspect, provided is at least one computer readable medium (CRM) having an instruction to be executed by at least one processor to perform operations includes: receiving first resource direction information for the DU, the first resource direction information informing a direction of each of resources as a downlink, an uplink, or a flexible, receiving second resource direction information for the MT, the second resource direction information informing a direction of each of the resources as a downlink, an uplink, or a flexible and for a specific resource among the resources, determining whether the DU and the MT can simultaneously operate based on a direction informed by the first resource direction information and a direction informed by the second resource direction information.

In still another aspect, provided is a method for a parent node to communicate with an integrated access and backhaul (IAB) node including a distributed unit (DU) and a mobile terminal (MT) in a wireless communication system. The method includes transmitting, to the IAB node, first resource direction information for the DU, the first resource direction information informing a direction of each of resources as a downlink, an uplink, or a flexible, transmitting, to the IAB node, second resource direction information for the MT, the second resource direction information informing a direction of each of the resources as a downlink, an uplink, or a flexible and communicating with the IAB node in a resource on which the DU and the MT can simultaneously operate among the resources based on the first resource direction information and the second resource direction information.

In still another aspect, provided is a parent node. The parent node includes a transceiver, at least one memory and a processor operatively coupled with the transceiver and the at least one memory. The processor is configured to: transmit, to an integrated access and backhaul (IAB) node including a distributed unit (DU) and a mobile terminal (MT), first resource direction information for the DU, the first resource direction information informing a direction of each of resources as a downlink, an uplink, or a flexible, transmit, to the IAB node, second resource direction information for the MT, the second resource direction information informing a direction of each of the resources as a downlink, an uplink, or a flexible and communicate with the IAB node in a resource on which the DU and the MT can simultaneously operate among the resources based on the first resource direction information and the second resource direction information.

Resource allocation was defined on the premise that the DU and MT of the conventional IAB node operate at different times like in time domain multiplexing (TDM). On the other hand, the future IAB node may also be capable of simultaneous operation of the DU and the MT. In this case, in order to maintain backward compatibility with the existing system, it is recommended not to significantly change the existing resource allocation method if possible. In consideration of this aspect, the present disclosure provides a method of determining a resource supporting simultaneous operation of DU and MT while maximally reusing existing resource allocation related configurations.

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

Figure 1:
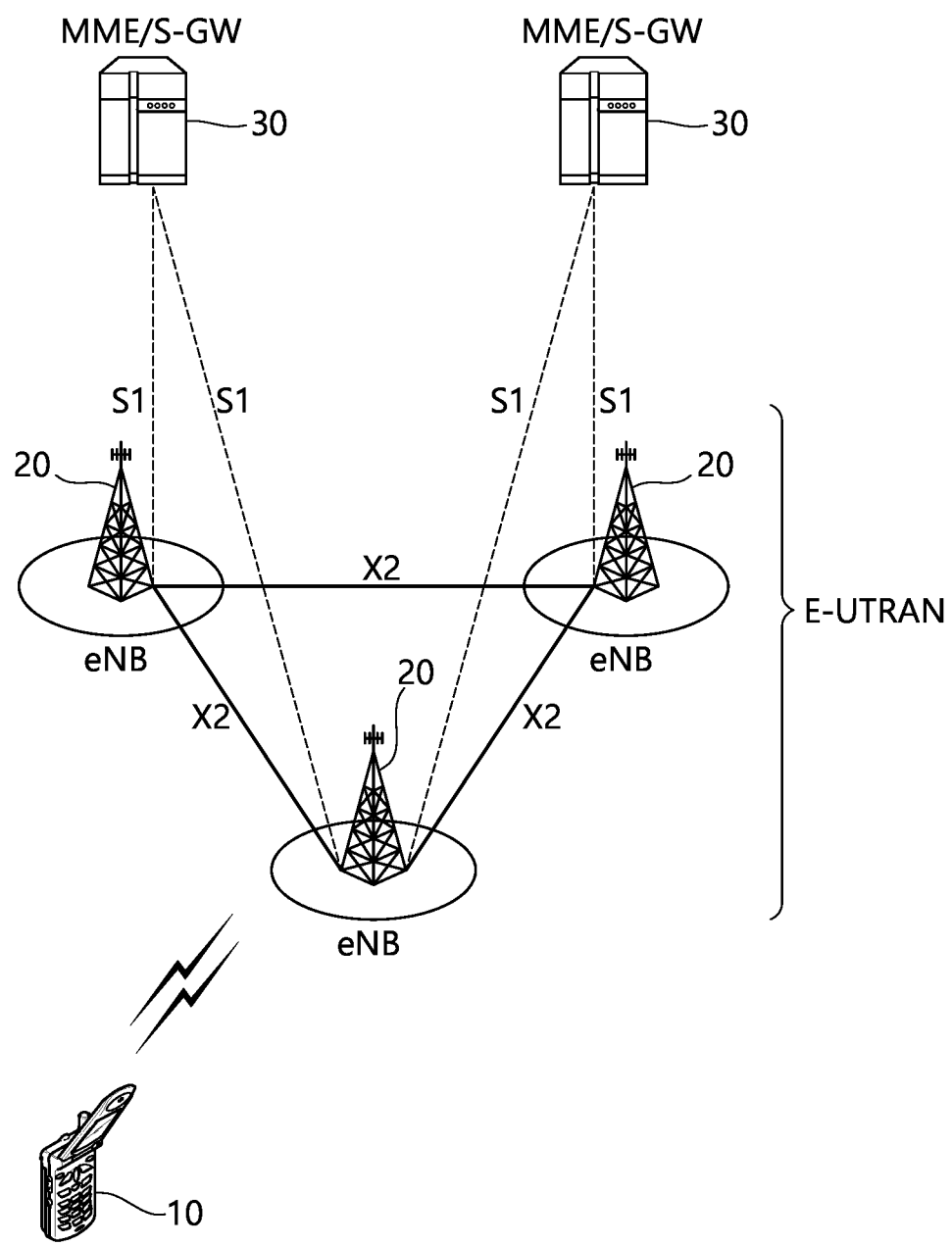
FIG. 1 shows a wireless communication system to which the present disclosure can be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
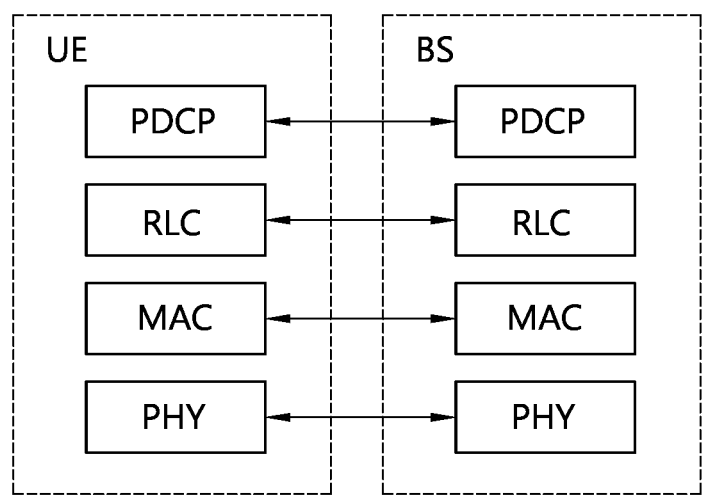
FIG. 2 is a diagram showing a wireless protocol architecture for a user plane.
Figure 3:
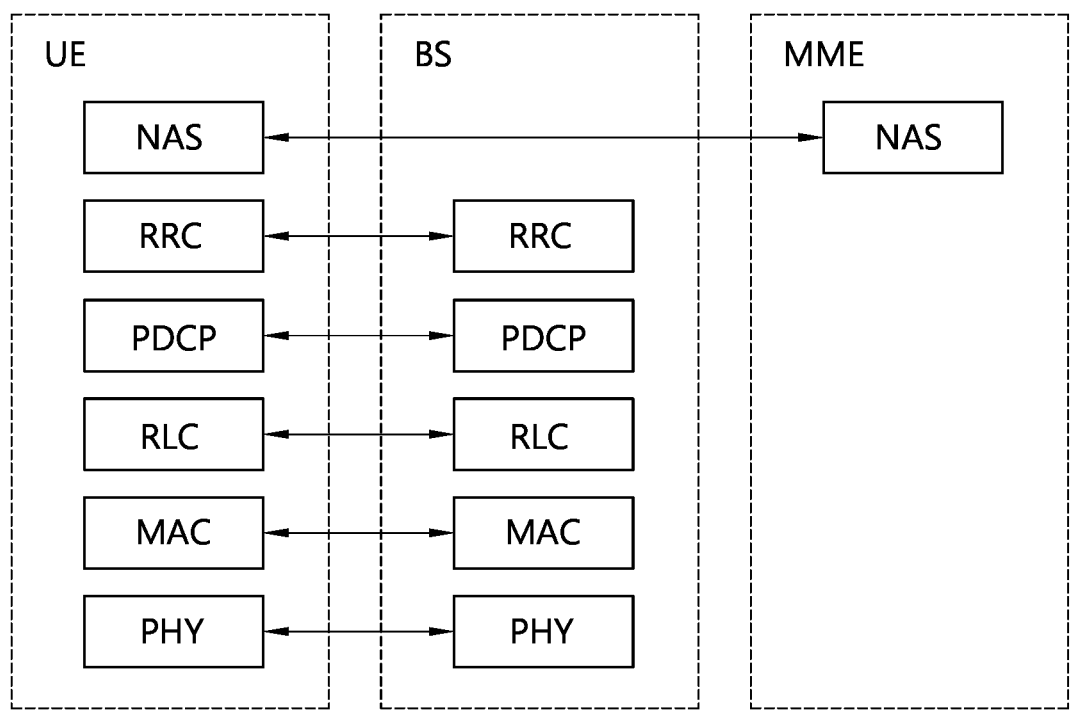
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer(=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
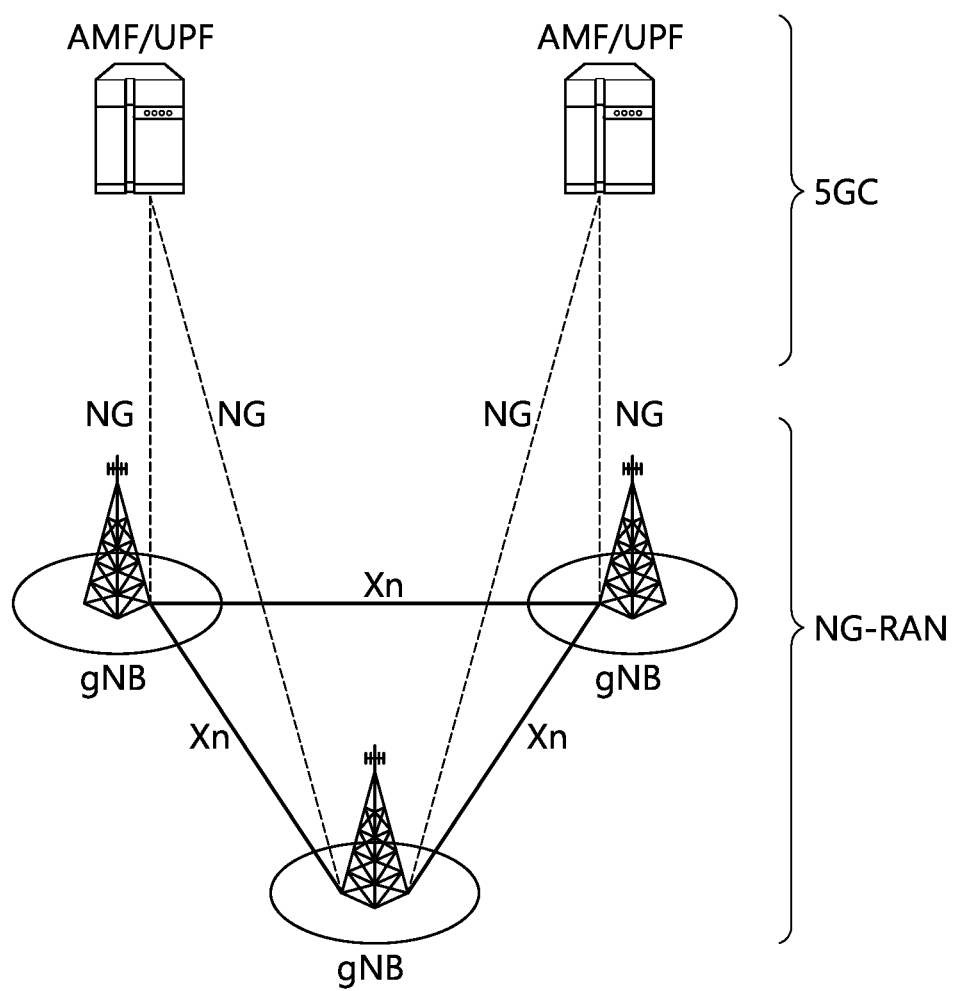
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a UE. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
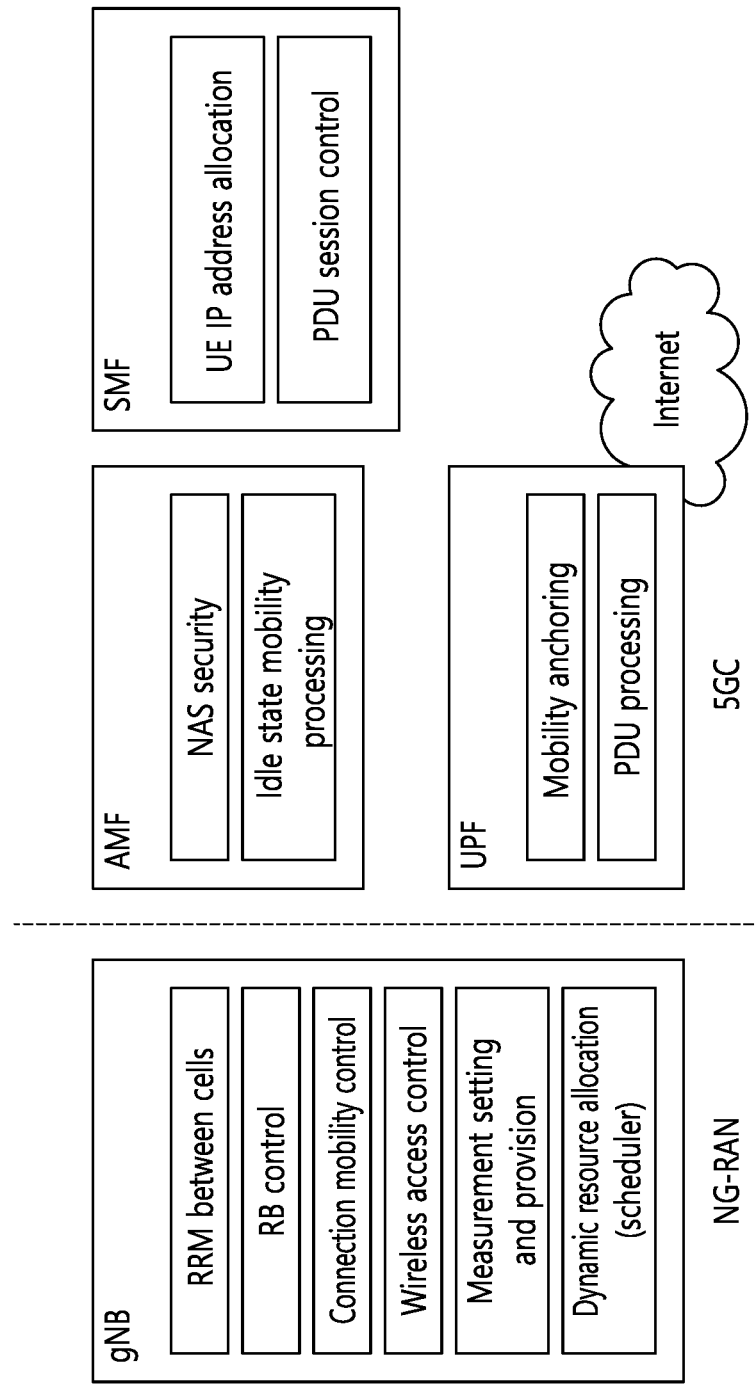
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
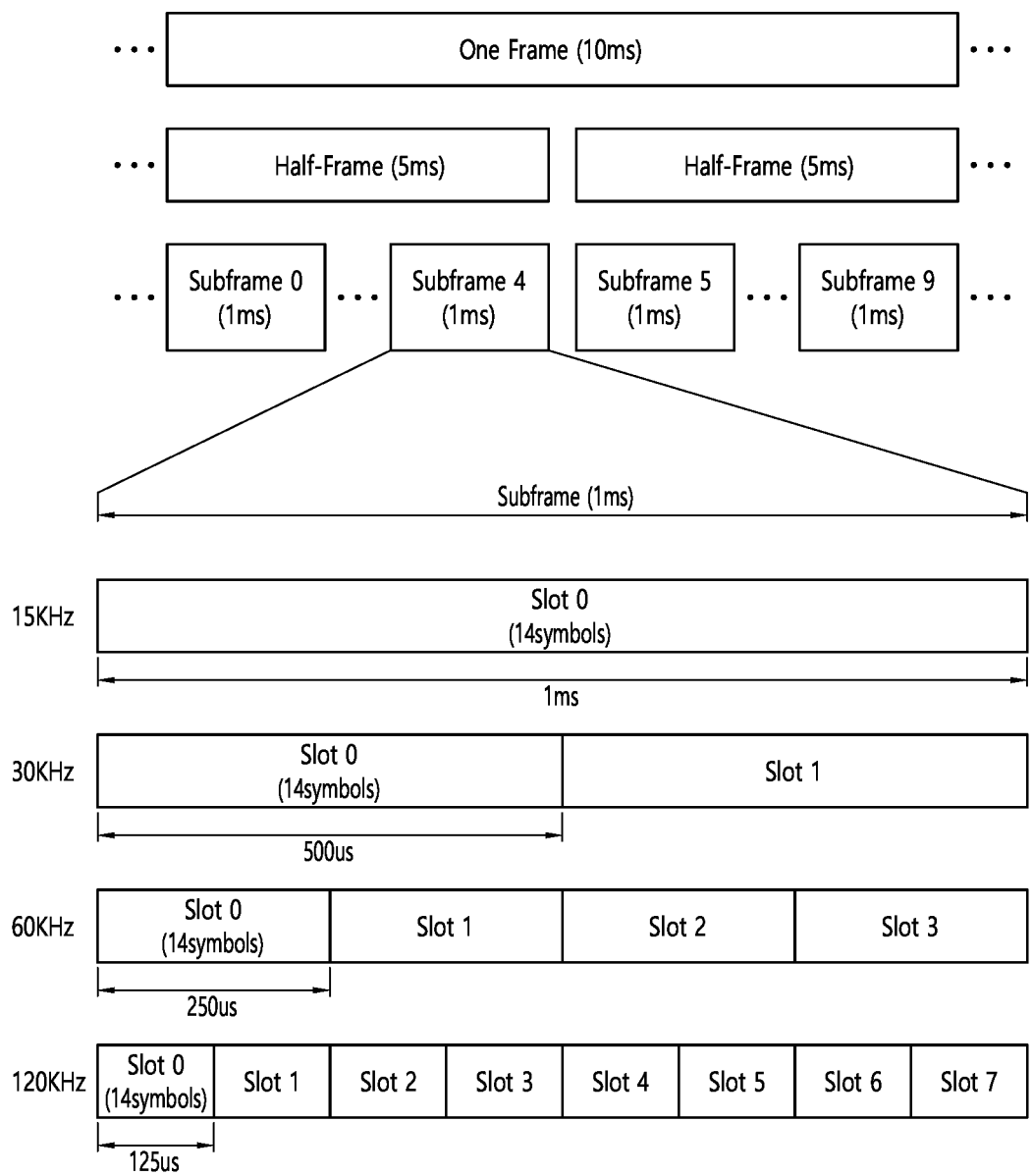
FIG. 6 illustrates an example of a frame structure that may be applied in NR.

FIG. 6 illustrates an example of a frame structure that may be applied in NR.

Referring to FIG. 6, in the NR, a radio frame (hereinafter, also referred to as a frame) may be used in uplink and downlink transmissions. The frame has a length of 10 ms, and may be defined as two 5 ms half-frames (HFs). The HF may be defined as five 1 ms subframes (SFs). The SF may be divided into one or more slots, and the number of slots within the SF depends on a subcarrier spacing (SCS). Each slot includes 12 or 14 OFDM(A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

The following table 1 illustrates a subcarrier spacing configuration $\mu$.

TABLE 1

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal |
|  |  | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations $\mu$.

TABLE 2

| $\mu$ | $N^{slot}_{symb}$ | $N^{frame, \mu}_{slot}$ | $N^{subframe, \mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 illustrates a case of $\mu$=0, 1, 2, 3.

Table 2-1 below illustrates that the number of symbols per slot, the number of slots per frame, and the number of slots per subframe vary depending on the SCS, in case of using an extended CP.

TABLE 2-1

| $\mu$ | $N^{slot}_{symb}$ | $N^{frame, u}_{slot}$ | $N^{subframe, u}_{slot}$ |
|---|---|---|---|
| 2 | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
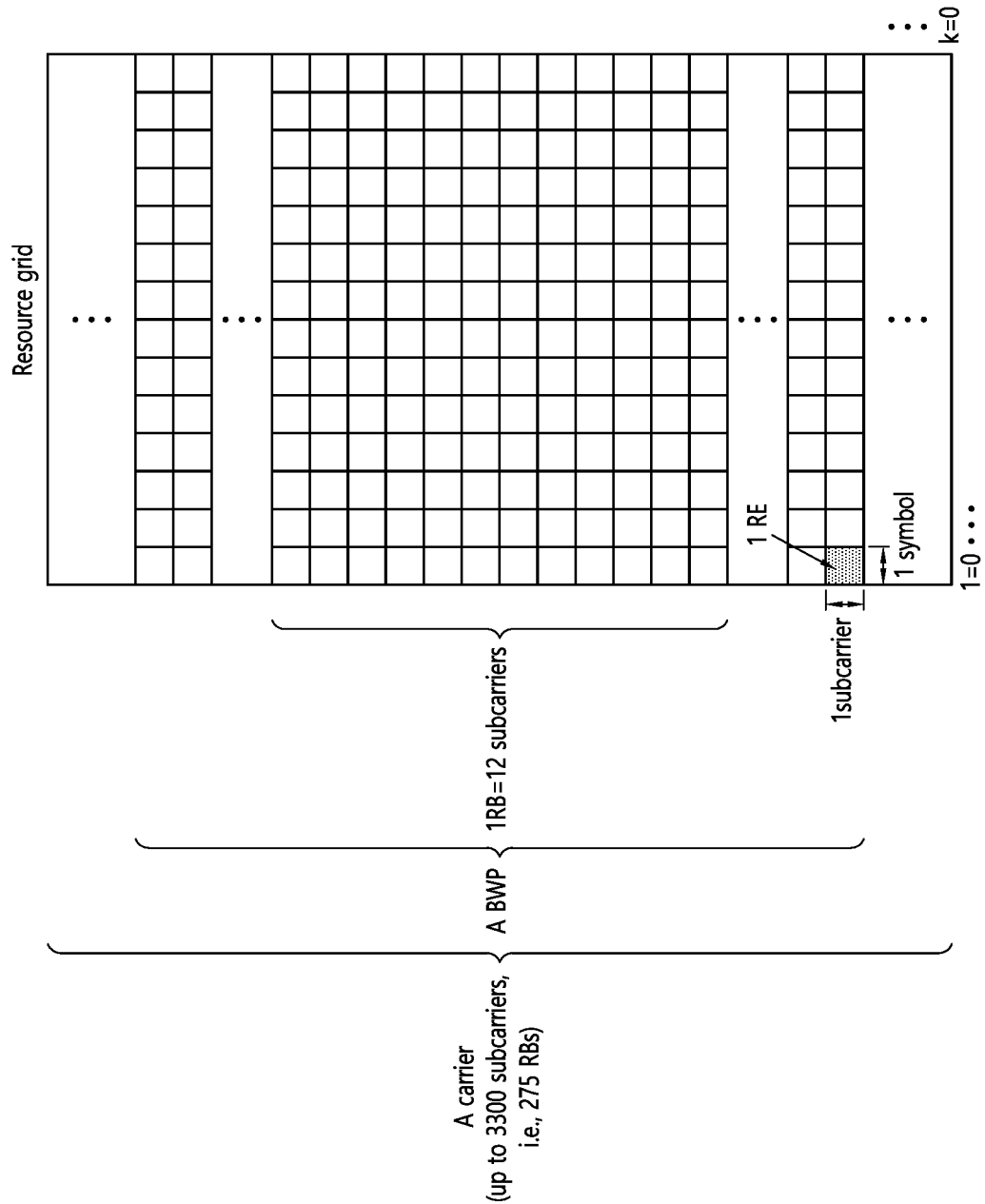
FIG. 7 illustrates a slot structure of an NR frame.

FIG. 7 illustrates a slot structure of an NR frame.

A slot may include a plurality of symbols in a time domain. For example, in case of a normal CP, one slot may include 7 symbols. However, in case of an extended CP, one slot may include 6 symbols. A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an activated BWP, and only one BWP may be activated for one UE. In a resource grid, each element may be referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring implies decoding of each PDCCH candidate according to a downlink control information (DCI) format. The UE monitors a set of PDCCH candidates in one or more CORESETs (to be described below) on an active DL BWP of each activated serving cell in which PDCCH monitoring is configured, according to a corresponding search space set.

A new unit called a control resource set (CORESET) may be introduced in the NR. The UE may receive a PDCCH in the CORESET.

Figure 8:
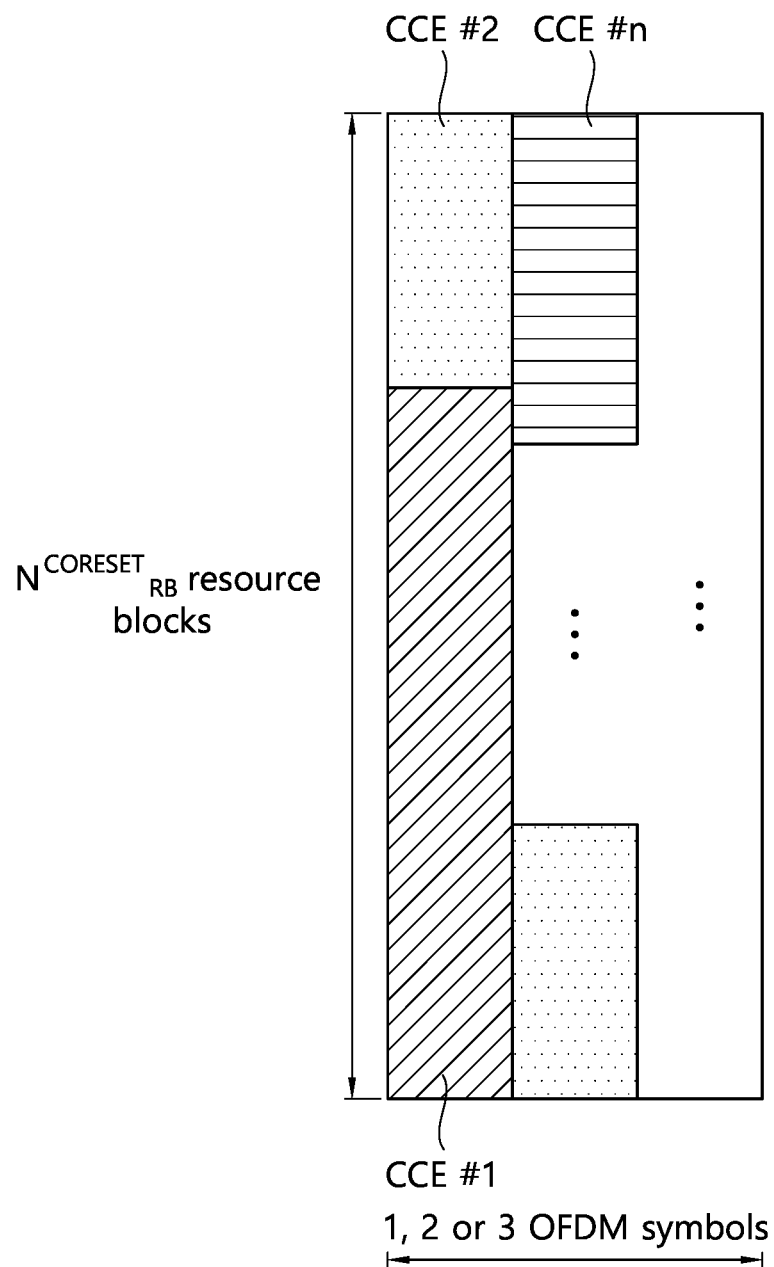
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 9:
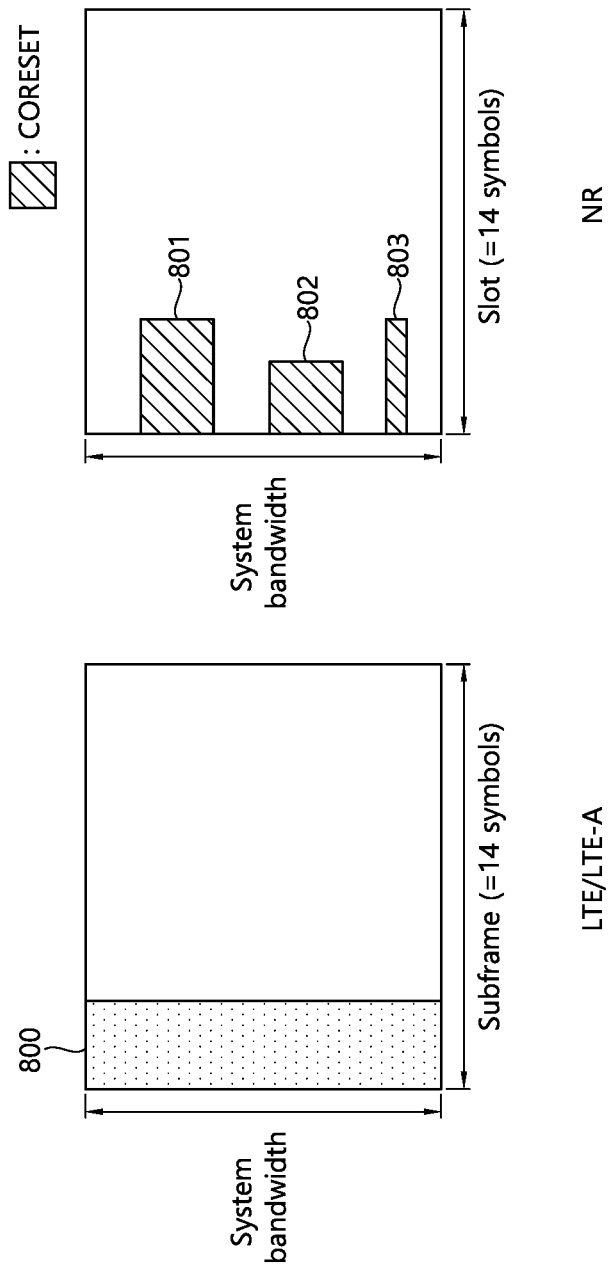
FIG. 9 is a diagram illustrating a difference between a related art control region and the CORESET in NR.

FIG. 9 is a diagram illustrating a difference between a related art control region and the CORESET in NR.

Referring to FIG. 9, a control region 800 in the related art wireless communication system (e.g., LTE/LTE-A) is configured over the entire system band used by a base station (BS). All the UEs, excluding some (e.g., eMTC/NB-IoT UE) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the UE and may use only a portion, rather than the entirety of the system bandwidth. The BS may allocate the CORESET to each UE and may transmit control information through the allocated CORESET. For example, in FIG. 9, a first CORESET 801 may be allocated to UE 1, a second CORESET 802 may be allocated to UE 2, and a third CORESET 803 may be allocated to UE 3. In the NR, the UE may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
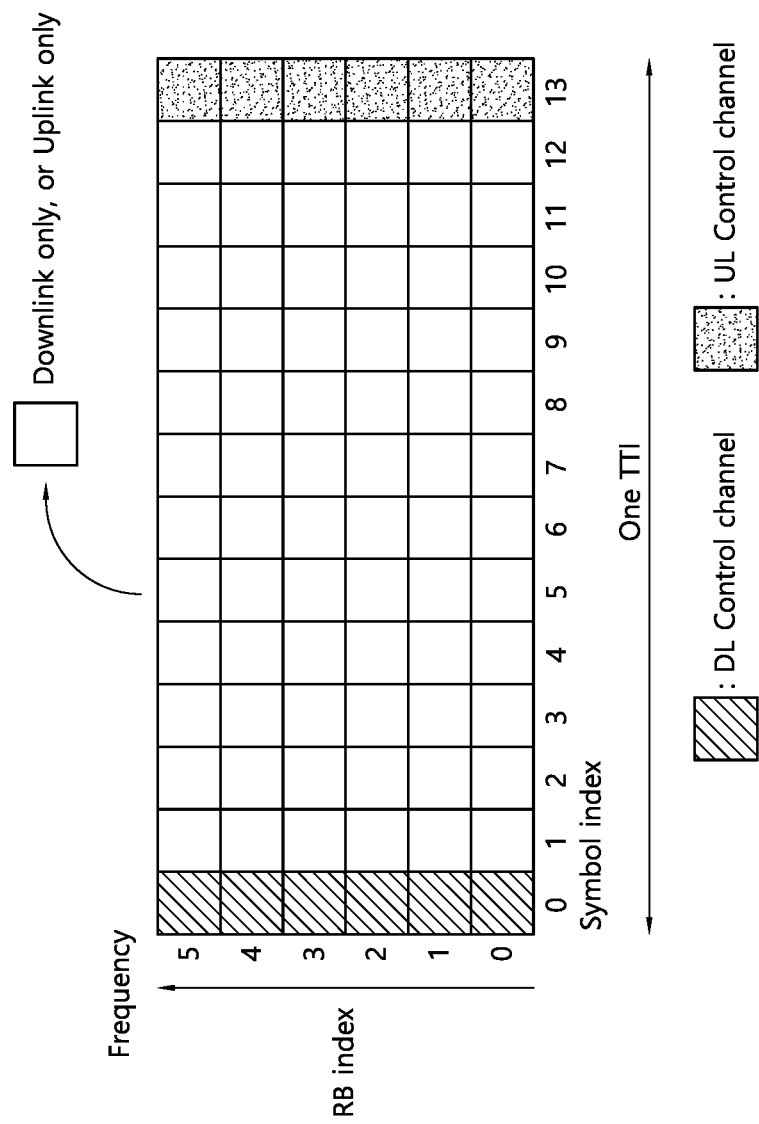
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 11:
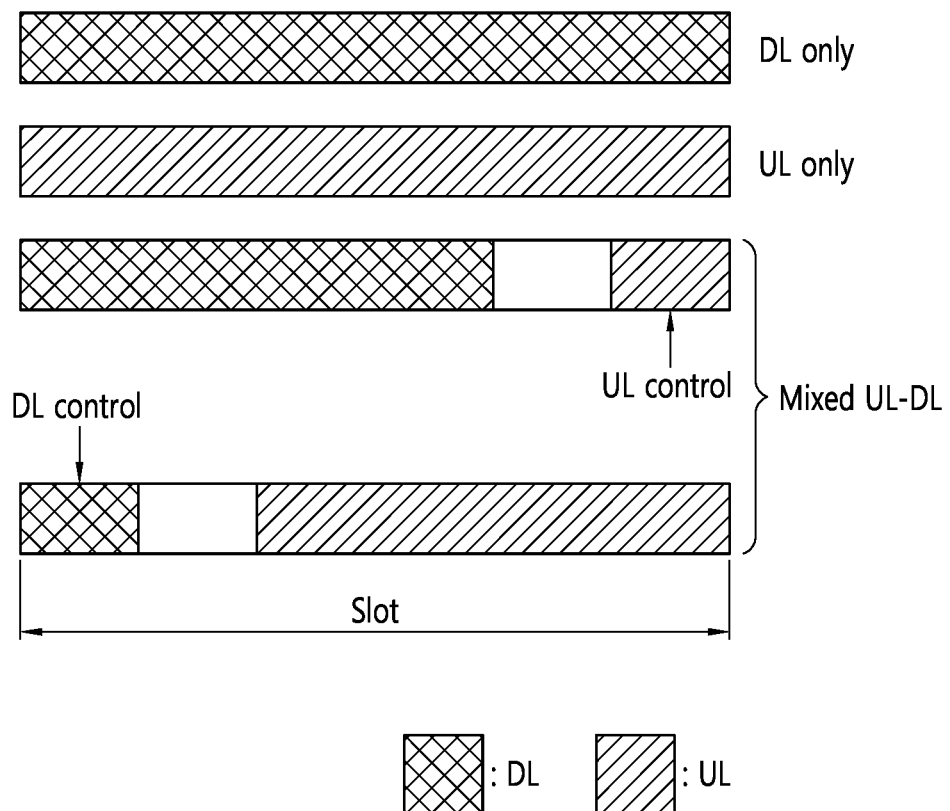
FIG. 11 illustrates a structure of a self-contained slot.

FIG. 11 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.
1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

System information of the NR system may be transmitted in a broadcasting manner. In this case, in one symbol, analog beams belonging to different antenna panels may be simultaneously transmitted. A scheme of introducing a beam RS (BRS) which is a reference signal (RS) transmitted by applying a single analog beam (corresponding to a specific antenna panel) is under discussion to measure a channel per analog beam. The BRS may be defined for a plurality of antenna ports, and each antenna port of the BRS may correspond to a single analog beam. In this case, unlike the BRS, a synchronization signal or an xPBCH may be transmitted by applying all analog beams within an analog beam group so as to be correctly received by any UE.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a PBCH associated with a primary synchronization signal (PSS), secondary synchronization signal (SSS), and demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, beams may be used for transmission and reception. If reception performance of a current serving beam is degraded, a process of searching for a new beam through the so-called Beam Failure Recovery (BFR) may be performed. Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.
1) CORESET index p (one of 0 to 11, where index of each CORESET may be determined uniquely among BWPs of one serving cell),
2) PDCCH DM-RS scrambling sequence initialization value,
3) Duration of a CORESET in the time domain (which may be given in symbol units), 4) Resource block set,
5) CCE-to-REG mapping parameter,
6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'),
7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
| --- | --- |
| QCL-TypeA | Doppler shift, Doppler spread, Average delay, Delay spread |
| QCL-TypeB | Doppler shift, Doppler spread' |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDCCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s (0≤s<40), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 12:
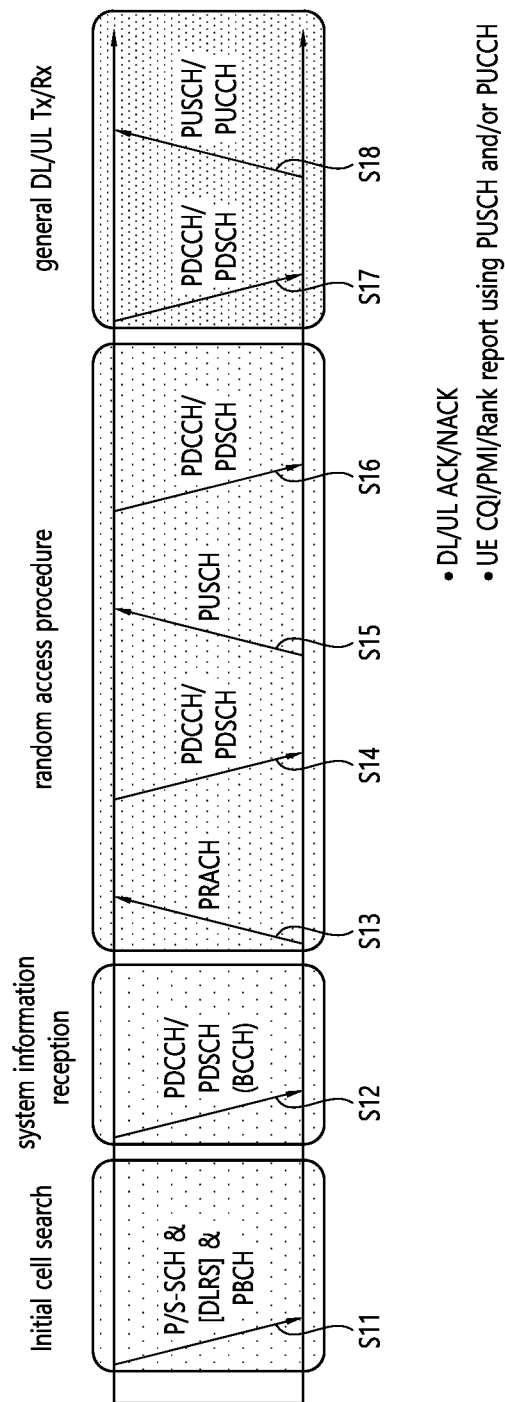
FIG. 12 illustrates physical channels and typical signal transmission.

FIG. 12 illustrates physical channels and typical signal transmission.

Referring to FIG. 12, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (NACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Hereinafter, an integrated access and backhaul link (IAB) will be described. Meanwhile, hereinafter, for convenience of description, a proposed method will be described based on a new RAT (NR) system. However, the range of the system to which the proposed method is applied is expandable to other systems such as 3GPP LTE/LTE-A systems in addition to the NR system.

One of the potential technologies aimed at enabling future cellular network deployment scenarios and applications is support for wireless backhaul and relay links, and it enables flexible and highly dense deployment of NR cells without the need to proportionally densify the transport network.

It is expected that greater bandwidth in NR compared to LTE will be available (e.g., mmWave spectrum) with the native deployment of massive MIMO or multi-beam systems, thus, opportunities are created for the development and deployment of integrated access and backhaul links. This makes it easier of a dense network of self-backhauled NR cells in a more integrated manner by establishing multiple control and data channels/procedures defined to provide access or access to the UEs. Such systems are referred to as integrated access and backhaul links (IAB).

The present disclosure defines the following.

AC (x): an access link between the node (x) and the UE(s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

In addition, in the present disclosure, for convenience of explanation, when relay node 1 and relay node 2 exist, relay node 1 which is connected to relay node 2 by a backhaul link and relaying data transmitted and received to relay node 2 is called a parent node of relay node 2, and relay node 2 is called a child node of relay node 1.

Technical features that are individually described in one drawing in this specification may be implemented individually or simultaneously.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 13:
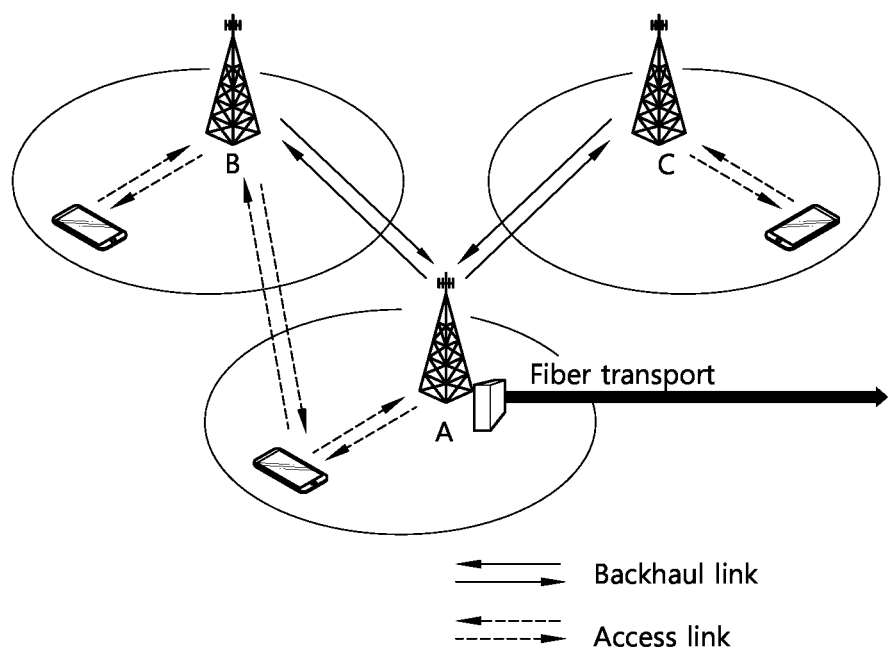
FIG. 13 schematically illustrates an example for a network with integrated access and backhaul links (IAB).

FIG. 13 schematically illustrates an example for a network with integrated access and backhaul links (IAB).

According to FIG. 13, relay nodes (rTRPs) may multiplex access and backhaul links in the time, frequency, or space domain (i.e., beam-based operation).

The operation of different links may operate on the same frequency or on different frequencies (which may also be referred to as 'in-band' or 'out-band' relays, respectively). Efficient support of out-of-band relays may be important for some NR deployment scenarios. Close interworking with access links operating on the same frequency to accommodate duplex restrictions and avoid/mitigate interference is also very important.

Furthermore, operating the NR system in the millimeter wave spectrum may have problems such as severe short-term blocking that cannot be easily mitigated by the current RRC-based handover mechanism. Overcoming the short-term blocking in mmWave systems may require a fast RAN-based mechanism for switching between rTRPs that does not necessarily require the inclusion of a core network. It may also be necessary to develop an integrated framework that allows for fast switching of over-access and backhaul links. Over-the-air (OTA) coordination between rTRPs may also be considered to mitigate interference and support end-to-end path selection and optimization.

Addressing the following requirements in relation to IAB in NR may be necessary.

Efficient and flexible operation for in-band and out-of-band relaying in indoor and outdoor scenarios Multi-hop and redundant connections End-to-end path selection and optimization Support of backhaul links with high spectral efficiency Support of legacy NR UEs Legacy NR is designed to support half-duplex devices. Thus, half-duplex is supported and deserves to be targeted in the IAB scenario. Furthermore, IAB devices having a full duplex may also be considered.

In the IAB scenario, if each relay node (RN) does not have the scheduling capability, the donor gNB (DgNB) must schedule the entire links between the DgNB, related relay nodes and UEs. In other words, the DgNB should make a scheduling decision for all links by collecting traffic information from all related relay nodes, and then inform each relay node of the scheduling information.

On the other hand, distributed scheduling can be performed when each relay node has a scheduling capability. Then, immediate scheduling of the uplink scheduling request of the UE is possible, and the backhaul/access link can be used more flexibly by reflecting the surrounding traffic conditions.

Figure 14:
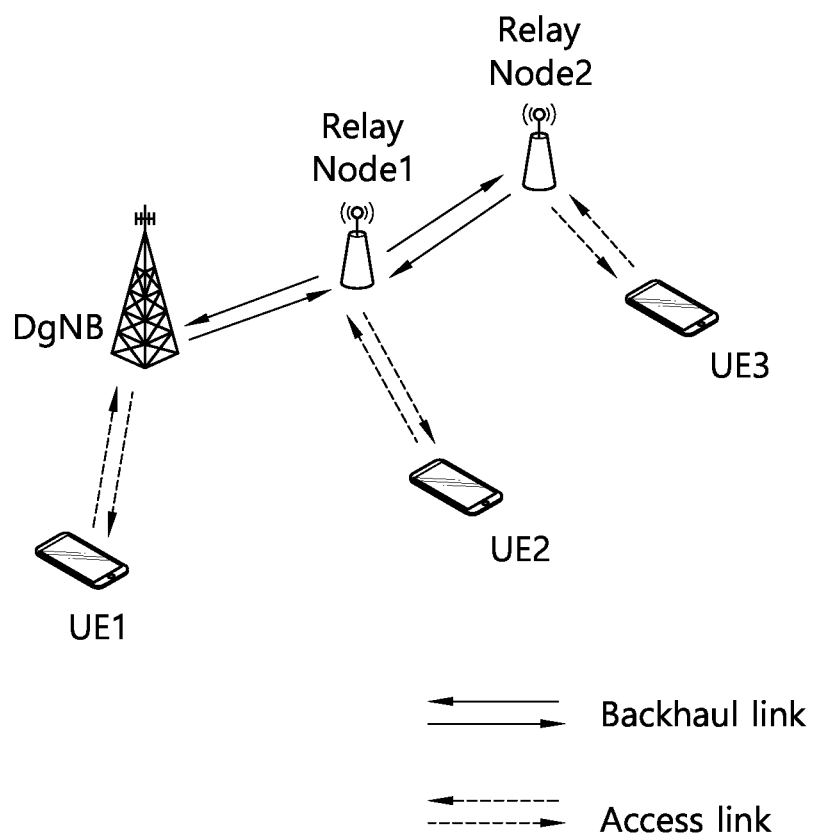
FIG. 14 schematically illustrates an example of the configuration of access and backhaul links.

FIG. 14 schematically illustrates an example of the configuration of access and backhaul links.

FIG. 14 illustrates an example in which a backhaul link and an access link are configured when DgNB and IAB relay nodes (RNs) exist. The DgNB, relay node 1, and relay node 2 are connected to a backhaul link, and UEs 1, 2, and 3 are sequentially connected to the DgNB, relay node 1, and relay node 2 through the access link.

The DgNB may make a scheduling decision of two backhaul links and three access links, and inform the scheduling results. Such centralized scheduling may include scheduling delays and cause latency issues.

If each relay node has a scheduling capability, distributed scheduling may be performed. Then, immediate scheduling of the uplink scheduling request of the UE can be performed, and the backhaul/access links can be used more flexibly by reflecting the surrounding traffic conditions.

Figure 15:
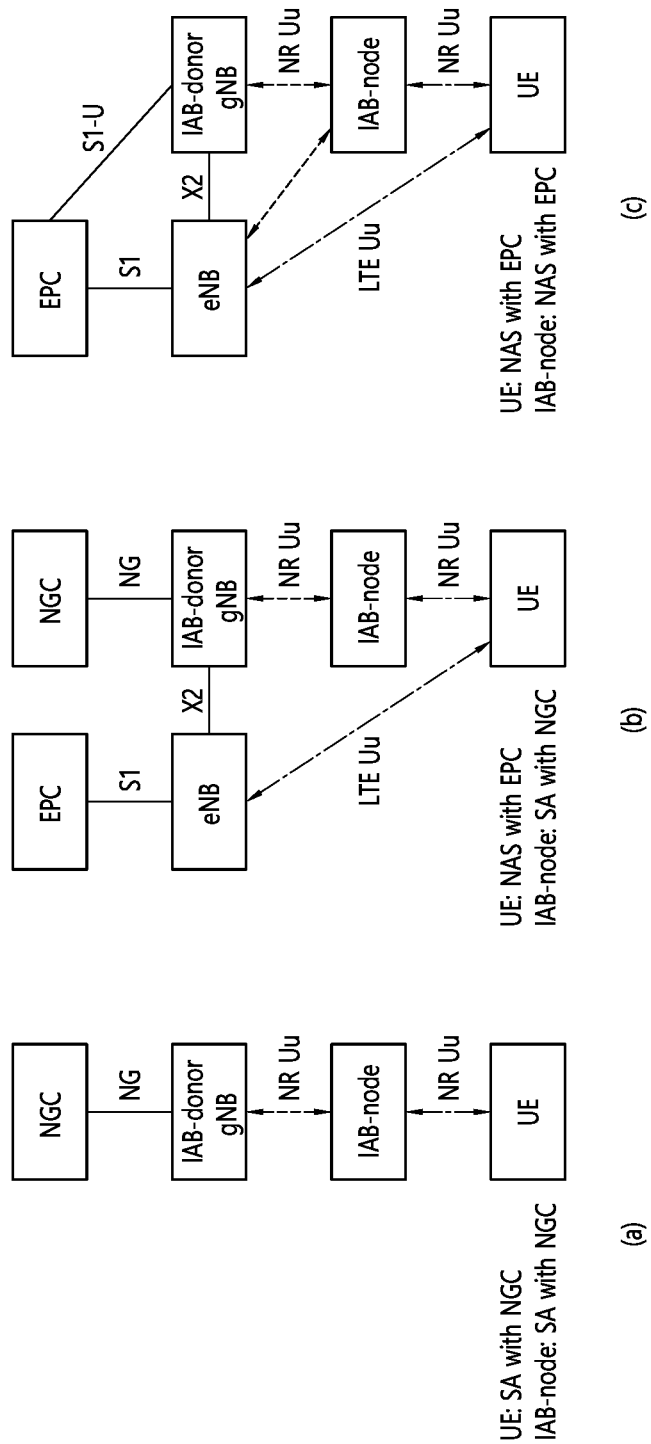
FIG. 15 illustrates the IAB node operating in stand alone (SA) mode or non-stand alone (NSA).

FIG. 15 illustrates that the IAB node operates in stand alone (SA) mode or non-stand alone (NSA).

FIG. 15 (a) illustrates that both the UE and the IAB node operate in SA mode in relation to the NGC, FIG. 15 (b) illustrates that the UE operates in the NSA mode in relation to the EPC while the IAB node operates in the SA mode in the relation with the NGC, and FIG. 15 (c) illustrates that both the UE and the IAB node operate in the NSA mode in relation to the EPC.

That is, the IAB node may operate in SA mode or NSA mode. When operating in NSA mode, the IAB node uses only the NR link for backhauling. A UE connecting to the IAB node may select an operation mode different from that of the IAB node. The UE may additionally connect to a different type of core network than the connected IAB node. IAB nodes operating in NSA mode may be connected to the same or different eNBs. A UE operating in the NSA node may connect to the same or different eNB as the connected IAB node.

Figure 16:
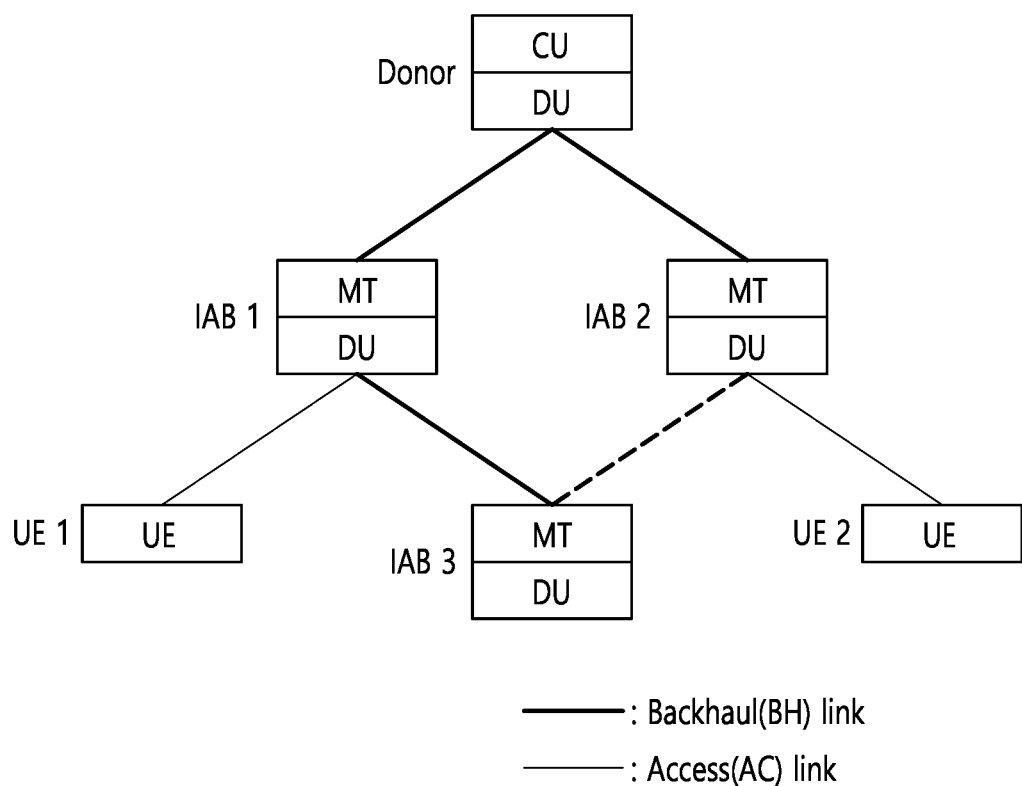
FIG. 16 illustrates a backhaul link and an access link.

FIG. 16 illustrates a backhaul link and an access link.

Referring to FIG. 16, a link between a donor node (which may be referred to as a parent node) and an IAB node or a link between IAB nodes is called a backhaul link. On the other hand, the link between the donor node and the UE or the link between the IAB node and the UE is called an access link. Specifically, the link between the MT of the IAB node and the DU of the parent node or the link between the DU of the IAB node and the MT of the child node of the IAB node is called a backhaul link, and the link between the DU of the IAB node and the UE may be referred to as an access link.

In the existing IAB node, the DU and the MT performed TDM operation which is to operate through different time resources. On the other hand, in a future communication system, it may be required to perform resource multiplexing such as SDM/FDM and full duplexing (FD) between DUs and MTs for efficient resource management.

Figure 17:
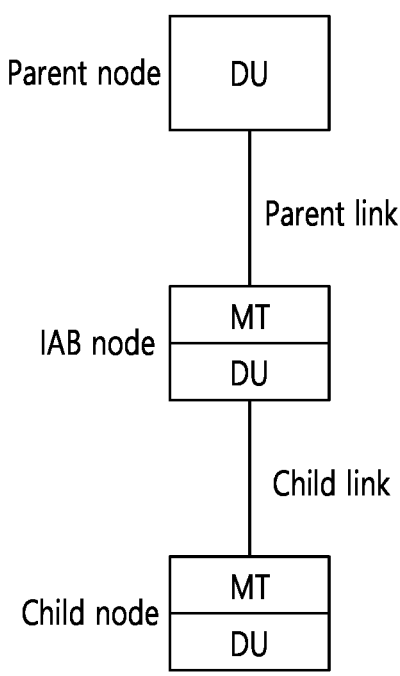
FIG. 17 illustrates a parent link and a child link.

FIG. 17 illustrates a parent link and a child link.

Referring to FIG. 17, a link between an IAB node (specifically, IAB MT) and a parent node (specifically, parent DU) is referred to as a parent link, and a link between an IAB node (specifically, IAB DU) and a child node (specifically, child MT) is called a child link. The parent link may be the above-mentioned backhaul link, and the child link may be a backhaul link or an access link depending on what the child node is. That is, if the child node is an IAB node, it may be a backhaul link, and if the child node is a UE, it may be an access link. TDM operation between parent link and child link has been previously discussed, and SDM/FDM and FD operation are currently being discussed.

The Tx/Rx timing alignment method of the IAB node that can be considered in the IAB environment may be as follows.

Case 1: Alignment of DL transmission timing between IAB node and IAB donor.

Case 2: DL and UL transmission timings are aligned within the IAB node.

Case 3: DL and UL reception timings are aligned within the IAB node.

Case 4: Within the IAB node, use case 2 for transmission and case 3 for reception.

Case 5: In different time slots within the IAB node, use case 1 for access link timing and case 4 for backhaul link timing.

Case 6: Using the DL transmission timing of case 1 and the UL transmission timing of case 2.

Case 7: Using the DL transmission timing of case 1 and the UL transmission timing of case 3.

Hereinafter, some cases among the timing alignment cases will be described in more detail.

Timing alignment case 1 (hereinafter may be abbreviated as case 1).

Figure 18:
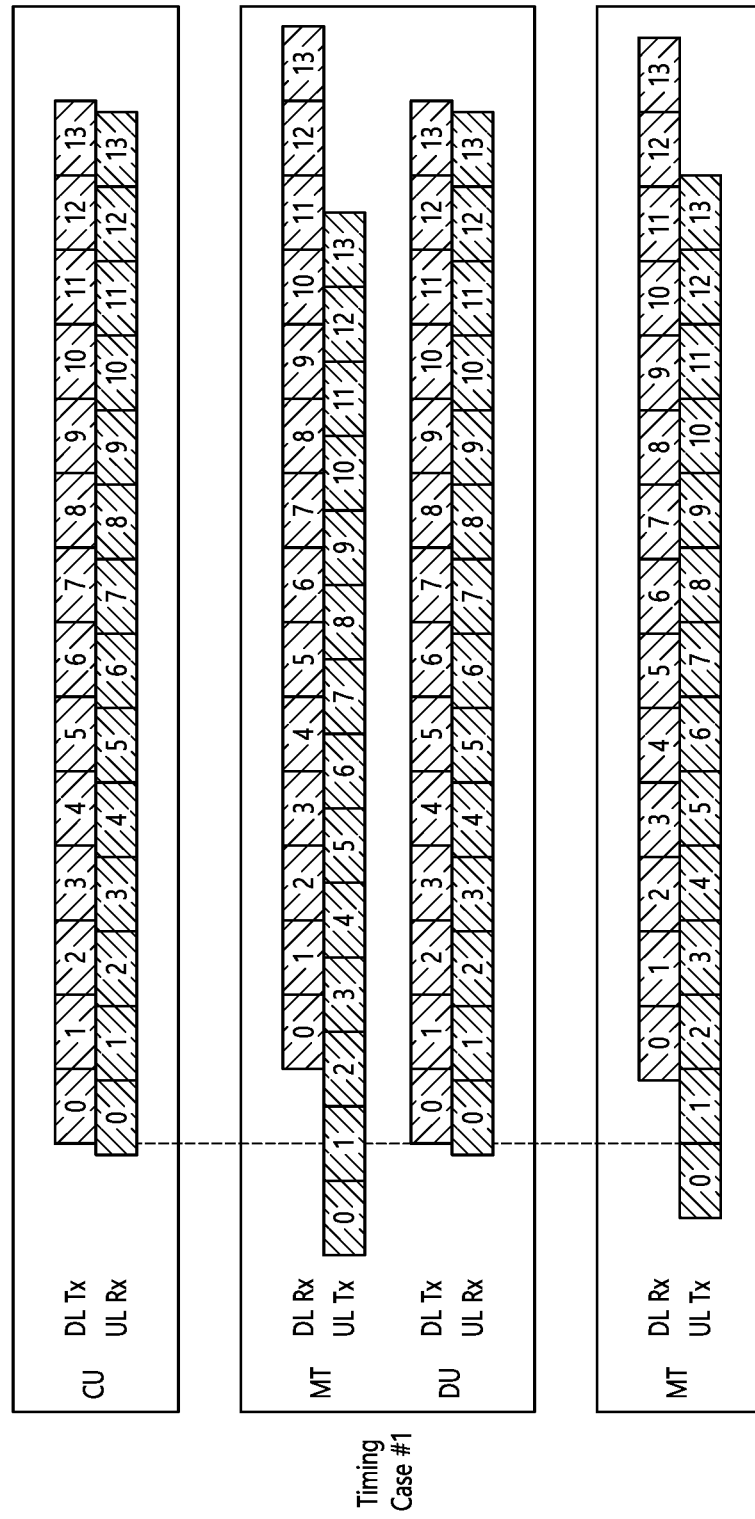
FIG. 18 illustrates timing alignment case 1.

FIG. 18 illustrates timing alignment case 1.

Referring to FIG. 18, in case 1, DL transmission (Tx) timing is aligned between an IAB node and an IAB donor (represented by a CU). That is, the DL Tx timing of DUs between IAB nodes is aligned, and this is a timing alignment method used by the Rel-16 IAB node.

If the DL Tx and UL Rx are not well aligned in the parent node, additional information about alignment may be required for the child node to properly set the DL Tx timing. The MT Tx timing may be expressed as 'MT Rx timing–TA', and the DU Tx timing may be expressed as 'MT Rx timing–TA/2–T_delta'. The T_delta value can be obtained from the parent node.

Timing alignment case 6 (hereinafter may be abbreviated as case 6)

Figure 19:
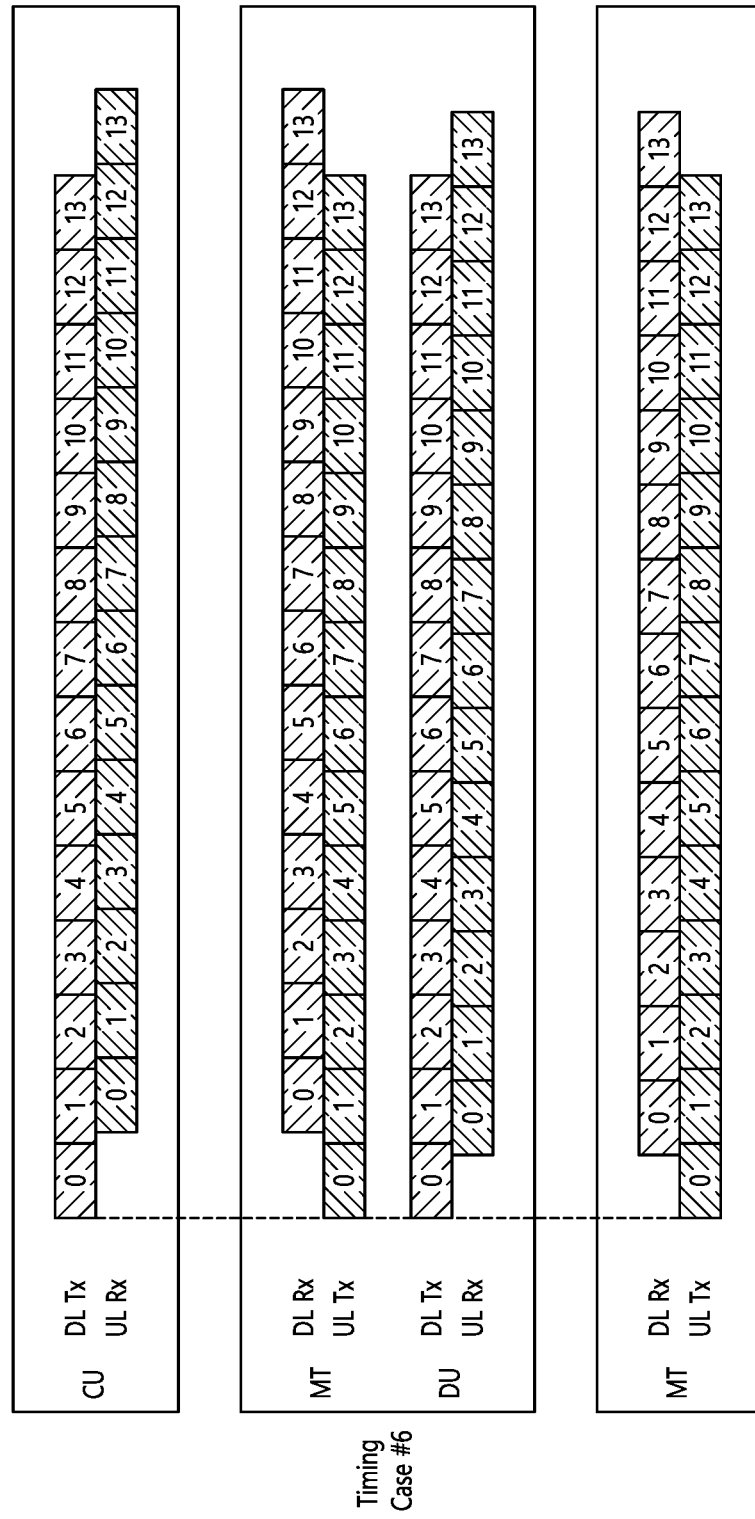
FIG. 19 illustrates timing alignment case 6.

FIG. 19 illustrates timing alignment case 6.

Referring to FIG. 19, Case 6 is a case in which DL transmission timings for all IAB nodes coincide with parent IAB node (CU) or donor DL timings. The UL transmission timing of the IAB node may be aligned with the DL transmission timing of the IAB node. That is, the MT UL Tx timing and the DU DL Tx timing of the IAB node are aligned.

Since the UL Tx timing of the MT is fixed, the UL Rx timing of the parent-DU receiving it is delayed by the propagation delay of the parent-DU and the MT compared to the UL Tx timing of the MT. The UL Rx timing of the MT varies according to the child MT that transmits the UL. When the IAB node uses the timing alignment case 6, the UL Rx timing of the parent node is different from the existing one. Therefore, if the IAB node wants to use the timing alignment case 6, the parent node also needs to know the corresponding information.

Timing alignment case 7.

Figure 20:
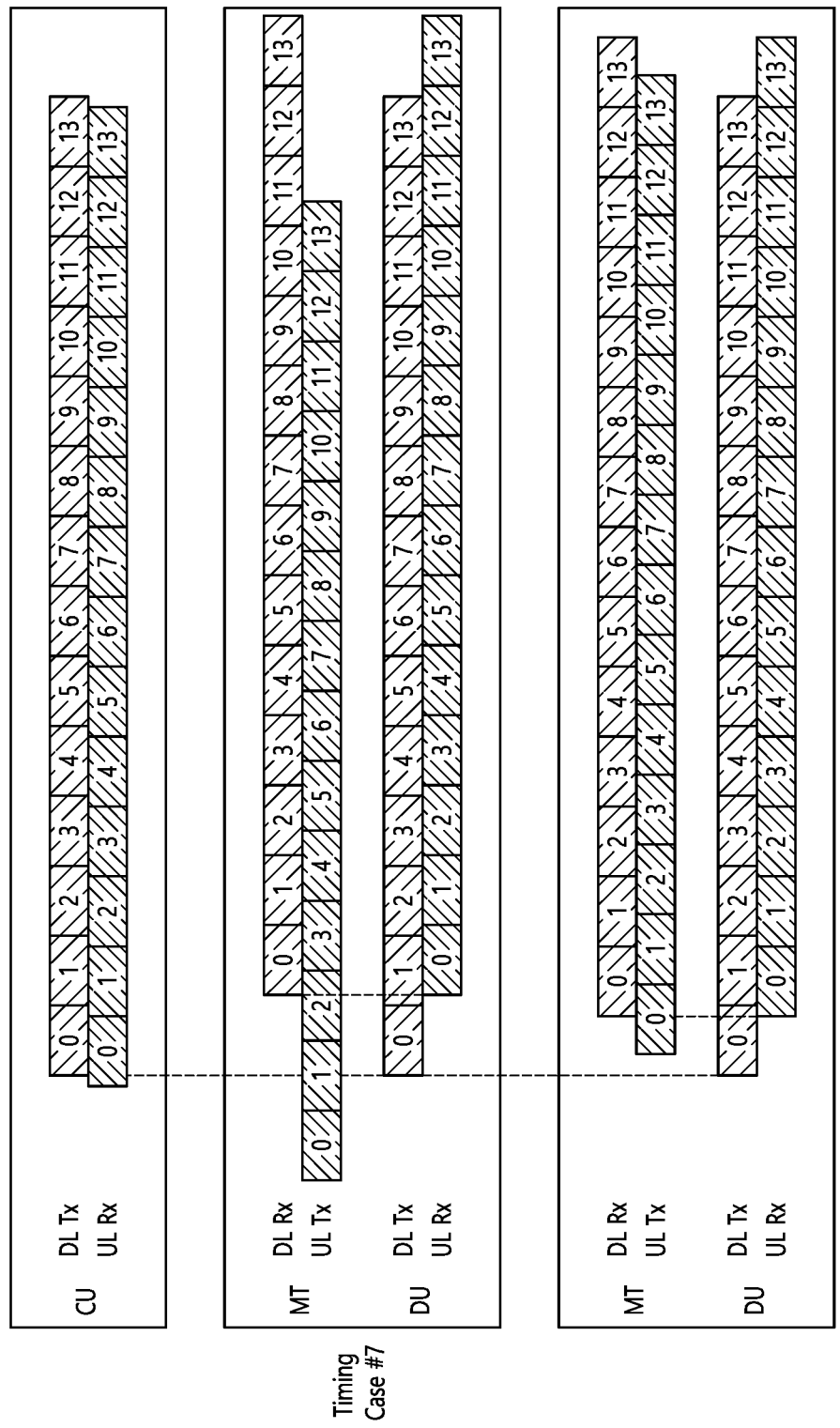
FIG. 20 illustrates timing alignment case 7.

FIG. 20 illustrates timing alignment case 7.

Referring to FIG. 20, in case 7, DL transmission timings for all IAB nodes coincide with parent IAB node or donor DL timings. The UL reception timing of the IAB node may coincide with the DL reception timing of the IAB node. If the DL Tx and UL Rx are not well aligned in the parent node, additional information about alignment may be required for the child node to properly set the DL Tx timing. Case 7 is a scheme in which the MT DL Rx timing of the IAB node and the DU UL Rx timing are aligned.

The transmission/reception timing from the MT perspective is the same as that of the existing IAB node (Rel-16 IAB node), and the UL Rx timing of the DU may be aligned with the DL Rx timing of the MT. The IAB node needs to adjust the TA of the child MTs so that the child MTs transmit UL signals according to IAB node's UL Rx timing.

This timing alignment method may not reveal a difference in the standard operation of the IAB node compared to the existing timing alignment method (Case 1). Accordingly, the timing alignment case 7 may be replaced/interpreted as the timing alignment case 1.

In the present disclosure, timing alignment may mean slot-level alignment or symbol-level alignment.

The content of the present disclosure is described assuming an in-band environment, but may also be applied in an out-band environment. In addition, the contents of the present disclosure are described in consideration of an environment in which a donor gNB (DgNB), a relay node (RN), and a UE perform a half-duplex operation, but the contents of the present disclosure may also be applied in an environment in which a donor gNB (DgNB), a relay node (RN), and/or a UE perform a full-duplex operation.

DU and MT existing in the same IAB node (or co-located) do not operate at the same time due to intra-node interference, slot/symbol boundary misalignment, power sharing, etc., and may operate with TDM.

Meanwhile, SDM/FDM multiplexing may be used between the DU and the MT. This is applicable, for example, when the DU and the MT use different panels, and there is little interference effect between the panels. In this case, the DU and the MT existing in the same IAB node (or co-located) can transmit or receive simultaneously. However, it is impossible or difficult for each of the DU and the MT to simultaneously perform transmission and reception or reception and transmission. For example, it is impossible or difficult for a DU to simultaneously transmit and receive.

Alternatively, full duplexing (FD) may be used between the DU and the MT. This is applicable when, for example, there is little interference between the DU and the MT, such as when the frequency region in which the DU operates and the frequency region in which the MT operates are far apart. In this case, the DU and the MT that exist in the same IAB node (or are co-located) can freely transmit and receive at the same time. The DU and the MT can transmit or receive at the same time, and it is also possible for the DU and the MT to perform transmission and reception or reception and transmission at the same time, respectively.

Figure 21:
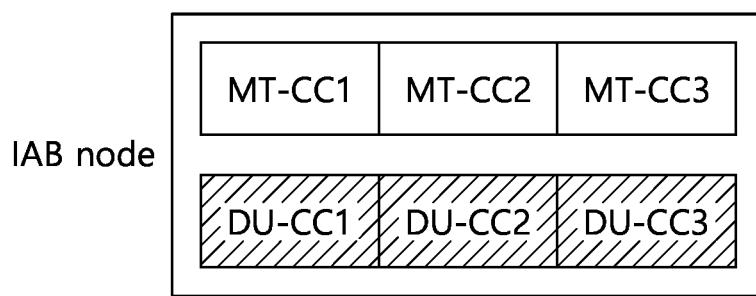
FIG. 21 shows an example of using a plurality of CCs in MT and DU of an IAB node.

FIG. 21 shows an example of using a plurality of CCs in MT and DU of an IAB node.

Referring to FIG. 21, the MT and DU of the IAB node may use a plurality of component carriers (CCs) (or it may be expressed that the MT and the DU of the IAB node consist of a plurality of CCs).

In this case, different CCs may operate in the same or different frequency region or may use the same or different panels. For example, as shown in FIG. 21, three CCs may exist in each of the MT and the DU in the IAB node. The three CCs in the MT are called MT-CC1, MT-CC2, and MT-CC3, respectively, and the three CCs in the DU are called DU-CC1, DU-CC2, and DU-CC3, respectively.

In this case, one multiplexing scheme among TDM, SDM/FDM, and FD may be applied between a specific CC of the MT and a specific CC of the DU. For example, when a specific MT-CC and a DU-CC are located in different inter-band frequency regions, FD may be applied between the corresponding MT-CC and the DU-CC.

On the other hand, the TDM scheme may be applied between the MT-CC and the DU-CC located in the same frequency region. For example, in FIG. 21, MT-CC1, MT-CC2, DU-CC1, and DU-CC2 have f1 as a center frequency, and MT-CC3 and DU-CC3 have f2 as a center frequency, f1 and f2 may be located within an inter-band of each other. In this case, it operates in TDM with DU-CC1 and DU-CC2 from the standpoint of MT-CC1 (or from the standpoint of MT-CC2), but may operate in FD with DU-CC3. On the other hand, from the standpoint of MT-CC3, it operates in FD with DU-CC1 and DU-CC2, but can operate in TDM with DU-CC3.

On the other hand, a different multiplexing scheme between the MT and the DU may be applied even within the same CC. For example, a plurality of parts may exist within the CC of the MT and/or DU. This part may mean, for example, a link having the same center frequency but transmitted through an antenna having a different physical location or a different panel. Or, this part may mean, for example, a link having the same center frequency but transmitted through different BWPs. In this case, for example, when two parts exist in DU-CC1, a multiplexing type operating with a specific MT-CC or a specific part in a specific MT-CC may be different for each part. The following disclosure describes a case in which the multiplexing type applied to each pair of the MT CC and the DU CC may be different, the disclosure can be extended and applied even when MT and DU are divided into a plurality of parts and the multiplexing type applied to each pair of MT CC and part and DU CC and part may be different.

In the context of the present disclosure, the DU-CC may be interpreted as being replaced with a DU cell.

From a DU perspective, a soft resource may be in an IA (indicated as available) state or a non-IA state. In this case, the non-IA state may be interpreted as an INA (indicated as not available) state. Whether the soft resource is IA may be indicated through AI (availability indicator) information, and the AI information may be indicated from the parent node to the IAB node through AI-DCI. The following DCI format 2_5 is an example of AI-DCI.

<DCI Format 2_5>

DCI format 2_5 is a DCI format used to inform the availability of soft resources. The following information may be transmitted through DCI format 25 together with CRC scrambled by AI-RNTI.

Availability indicator 1, availability indicator 2, . . . , availability indicator N.

The size of DCI format 2_5 with CRC scrambled by AI-RNTI may be configured by a higher layer up to 128 bits.

A. Simultaneous Operation for IAB MT and DU

In the present disclosure, an IAB node may refer to a pair of an MT and a DU in the IAB node, more specifically, a specific MT-CC/DU-cell pair.

The IAB node may operate in TDM or no-TDM for the following four Tx/Rx combinations.

1) DU-Tx/MT-Tx
2) DU-Rx/MT-Rx
3) DU-Tx/MT-Rx
4) DU-Rx/MT-Tx

For example, IAB Node 1 may operate in TDM for all four Tx/Rx combinations. IAB Node 2 may operate as no-TDM for 'DU-Tx/MT-Tx' and 'DU-Rx/MT-Rx', and may operate as TDM for the remaining combinations. When both the DU and the MT are configured to perform the Tx operation or the Rx operation in a specific time resource, in the IAB node 2, the DU and the MT may perform the simultaneous operation. IAB Node 3 may operate as no-TDM for all four Tx/Rx combinations. In this case, IAB node 3 may perform simultaneous operations in all time resources. Here, when simultaneous operation can be performed between the DU and the MT, only one of the two may operate if there is no channel/signal for the DU or the MT to transmit/receive.

In the present disclosure, for convenience of description, the TDM/no-TDM information for each of the four Tx/Rx combinations of the IAB node as described above is referred to as a 'multiplexing type' of the IAB node. When TDM/no-TDM information for each Tx/Rx combination of IAB Node 1 and IAB Node 2 is configured identically, IAB Node 1 and IAB Node 2 have the same multiplexing type, when TDM/no-TDM information for each Tx/Rx combination of IAB Node 1 and IAB Node 2 is configured differently, IAB Node 1 and IAB Node 2 have different multiplexing types.

In the present disclosure, for convenience of description, the multiplexing type may be referred to as follows.

a) TDM

If the IAB node has a multiplexing type set to TDM for all of DU-Tx/MT-Tx, DU-Rx/MT-Rx, DU-Tx/MT-Rx, DU-Rx/MT-Tx, it can be said that the IAB node performs a 'TDM' operation between the DU and the MT. That is, it can be said that it has a TDM multiplexing type.

b) Tx-SDM/FDM

If the IAB node is set to no-TDM between DU-Tx/MT-Tx and has a multiplexing type set to TDM for the remaining Tx/Rx combinations, it is called that the IAB node operates 'Tx-SDM/FDM' between the DU and the MT. That is, it can be said that it has a multiplexing type of Tx-SDM/FDM.

c) Rx-SDM/FDM

When the IAB node is set to no-TDM between DU-Rx/MT-Rx and has a multiplexing type set to TDM for the remaining Tx/Rx combinations, it is called that the IAB node operates 'Rx-SDM/FDM' between the DU and the MT. That is, it can be said that it has a multiplexing type of Rx-SDM/FDM.

d) Tx/Rx-SDM/FDM

When the IAB node is configured as no-TDM between DU-Tx/MT-Tx and DU-Rx/MT-Rx, and has a multiplexing type set to TDM for the remaining Tx/Rx combinations, it is called that the IAB node operates 'Tx/Rx-SDM/FDM' between the DU and the MT. That is, it can be said that it has a multiplexing type of Tx/Rx-SDM/FDM.

e) FD (Full Duplex)

When the IAB node has a multiplexing type set to no-TDM for all of DU-Tx/MT-Tx, DU-Rx/MT-Rx, DU-Tx/MT-Rx, DU-Rx/MT-Tx, it is called that the IAB node operates 'FD' between the DU and the MT. That is, it can be said that it has an FD multiplexing type.

A.1. DU and MT Resource Determination Method During FD Operation

Multiplexing of FD may be used between the DU and the MT that exist (or are co-located) within the same IAB node. In this section, the operations of DU and MT in this case are proposed.

If the IAB node has a multiplexing type that operates as an FD, that is, the multiplexing type of the IAB node is configured as no-TDM for all Tx/Rx combinations of DU-Tx/MT-Tx, DU-Rx/MT-Rx, DU-Tx/MT-Rx, and DU-Rx/MT-Tx, DU and MT can operate in all time resources. In this case, the DU and the MT may ignore H/S/NA attribute information transmitted in the DU configuration to determine their own operable resources. In addition, the IAB node (IAB MT) may not monitor the AI-DCI transmitted to indicate the availability information of the DU operation in the soft resource.

More specifically, it can operate as follows.

(1) MT Resource Availability Determination Method

When the FD operation between the MT and the DU in the same IAB node (or co-located) is possible, the resource availability of the MT can be determined as follows.

Alt 1.

The MT may determine that the operation of the MT is possible regardless of the DU's resource direction information (DU/U/F) and resource availability information (Hard/Soft/NA). That is, in determining the resource availability of the MT, the resource direction information (DU/U/F) and the resource availability information (Hard/Soft/NA) of the DU are not considered.

Alt 2.

The MT determines its own resource availability based on the DU's resource availability information (Hard/Soft/NA). At this time, in the present disclosure, only some of the following conditions may be applied to determine the availability of the MT. For example, only the conditions that enable the operation of the MT among the following are applied, and in the remaining resources, it may be determined that the operation of the MT is impossible. Or, for example, only the conditions that make the operation of the MT impossible among the following are applied, and in the remaining resources, it may be determined that the operation of the MT is possible.

i) In the case of the NA resource of the DU, it is determined that the MT operation is possible in the corresponding resource.

ii) In the case of the hard resource of the DU, it is determined that the operation of the MT is impossible in the corresponding resource.

iii) In the case of the DU soft resource, it is determined that the MT operation is possible in the corresponding resource. In this case, dynamic IA indication information is not considered in determining whether the MT can operate. That is, it is determined that the operation of the MT is possible even if the corresponding resource is dynamically indicated as IA.

(2) DU Resource Availability Determination Method

When the FD operation between the MT and the DU in the same IAB node (or co-located) is possible, the resource availability of the MT can be determined as follows.

Alt 1.

The DU may determine that the operation of the DU is possible regardless of its resource availability information (Hard/Soft/NA). That is, when the DU performs FD operations with the MT, even if resource availability information (Hard/Soft/NA) is set, the DU ignores the information and determines that the DU operation is possible. Alternatively, when the DU performs FD operation with the MT, it is assumed that all DU resources are hard resources even if resource availability information (Hard/Soft/NA) is configured.

Alt 2.

The DU determines its own resource availability based on its own resource availability information (Hard/Soft/NA).

i) In the case of the NA resource of the DU, it is determined that the operation of the DU is impossible in the corresponding resource.

ii) In the case of a hard resource of the DU, it is determined that the operation of the DU is possible in the corresponding resource.

iii) In the case of a soft resource of the DU, it is determined that the DU operation is possible in the corresponding resource. In this case, dynamic IA indication information is not considered in determining whether DU operation is possible. That is, it is determined that DU operation is possible even if the corresponding resource is not dynamically indicated as IA. Alternatively, the DU does not monitor DCI for transmitting dynamic IA indication information.

When Alt 1 is applied to both the resource availability determination method of the MT and the resource availability determination method of the DU, it means that MT and DU can simultaneously operate regardless of H/S/NA.

When Alt 1 and Alt 2 are respectively applied to the resource availability determination method of the MT and the resource availability determination method of the DU, MT and DU can simultaneously operate only in hard and soft resources, and simultaneous operation is not possible in NA resources, that is, it means that it operates as in legacy (i.e., DU does not transmit/receive).

When Alt 2 is applied to both the resource availability determination method of the MT and the resource availability determination method of the DU, MT and DU can operate simultaneously only on soft resources, and simultaneous operation is impossible in Hard and NA resources, meaning that it operates as legacy.

A.2. DU and MT Resource Determination Method During SDM/FDM Operation

Multiplexing of SDM/FDM may be used between DU and MT existing (or co-located) within the same IAB node. In this section, the operations of DU and MT in this case are proposed.

Figure 22:
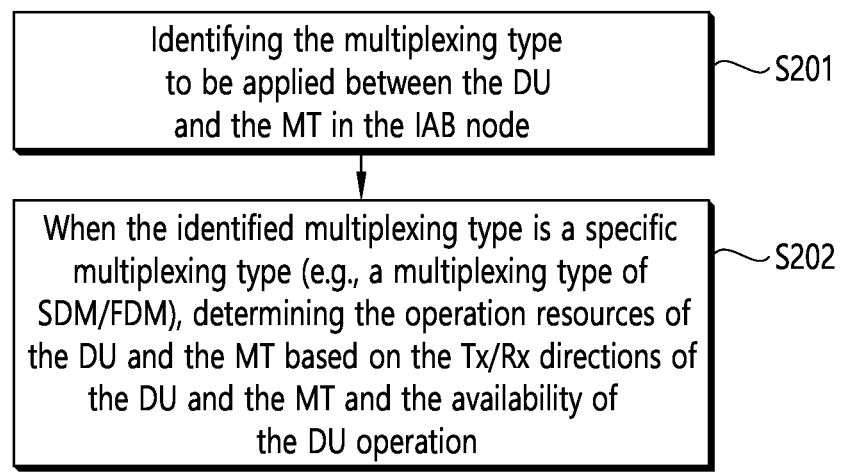
FIG. 22 is an example of an operation method of an IAB node.

FIG. 22 is an example of an operation method of an IAB node.

Referring to FIG. 22, the IAB node identifies the multiplexing type to be applied between the DU and the MT in the IAB node (S201). Then, when the identified multiplexing type is a specific multiplexing type (e.g., a multiplexing type of SDM/FDM), the operation resources of the DU and the MT may be determined based on the Tx/Rx directions of the DU and the MT and the availability of the DU operation (S202).

If the IAB node has a multiplexing type that does not operate as an FD, that is, the multiplexing type of the IAB node is set to no-TDM only for some combinations of DU-Tx/MT-Tx, DU-Rx/MT-Rx, DU-Tx/MT-Rx, and DU-Rx/MT-Tx, if set to no-TDM only for DU-Tx/MT-Tx and/or DU-Rx/MT-Rx, the operation resources of the DU and the MT may be determined according to the Tx/Rx directions of the DU and the MT and the availability of the DU operation.

The IAB node, based on the H/S/NA attribute information of the DU configuration configured to the IAB node (IAB DU) and the AI information instructed to the IAB node (IAB MT) through AI-DCI, the operation resources of the DU and MT can be determined. This method is applied only to some of the hard (Hard), soft (Soft), and not available (NA) resources, and includes that the legacy method is applied to the remaining resources.

1) DU Hard Resource a) In the DU hard resource, priority may be given to the operation of the DU. Accordingly, the DU can operate regardless of the Tx/Rx direction in the DU hard resource.

b) Whether the MT can operate may vary depending on a combination of the DU's Tx/Rx direction and its own Tx/Rx direction.

For example, when the DU and the MT have the Tx/Rx direction combination set to TDM in the DU hard resource, the MT does not operate. On the other hand, when the DU and the MT have the Tx/Rx direction combination set to no-TDM in the DU hard resource, the MT is operable.

However, in a resource in which the DU is set to be flexible in the DU hard resource, the following operation may be performed.

Alt a. It may be assumed that the MT knows the Tx/Rx direction information actually applied by the DU in the flexible resource. When the DU and the MT have a Tx/Rx direction combination set to TDM based on Tx/Rx direction information actually applied in the flexible resource by the DU, the MT does not operate. On the other hand, when the DU and the MT have a Tx/Rx direction combination set to no-TDM based on Tx/Rx direction information actually applied in the flexible resource by the DU, the MT is operable.

In this case, in order for the parent-DU to transmit/receive only on the MTs operable resource, the IAB node may inform the parent node of resource direction information in the flexible resource of the DU. For example, resource direction information in the flexible resource of the DU may be shared with the parent-DU through the MAC CE or the like. Or, in order for the parent-DU to perform transmission and reception only in the operable resource of the MT, an MT (IAB node) may share information on whether the MT can operate in the flexible resource of the DU.

Alt b. The IAB node may inform the parent node of whether MT operation is possible in the flexible resource of the DU. At this time, if it informs that the MT is operable in the flexible resource of the DU, the parent-DU and the MT may determine the corresponding resource as a resource in which the MT can operate. In this case, the DU sets/uses the resource direction of the child link to have the Tx/Rx direction in which no-TDM operation is possible in relation to the MT. On the other hand, if it informs that the MT is inoperable in the flexible resource of the DU, the parent-DU and the MT may determine the corresponding resource as a resource in which the MT cannot operate.

Alt c. It cannot be assumed that the MT knows the Tx/Rx direction information that the DU actually applies in the flexible resource, or it may not be possible to inform the parent node of the resource direction information in the flexible resource of the DU. Considering this case, the MT does not operate in a resource in which the DU is set to be flexible in the DU hard resource.

The operation method of DU and MT in the DU flexible resource is described in more detail in section A.3 below, and this method may be applied.

2) DU NA Resources a) In the DU NA resource, priority may be given to the operation of the MT. Accordingly, the MT can operate regardless of the Tx/Rx direction.

b) Whether the DU can operate may vary depending on a combination of the MTs Tx/Rx direction and its own Tx/Rx direction.

If the DU and the MT have the Tx/Rx direction combination set to TDM in the DU NA resource, the DU does not operate. On the other hand, when the DU and the MT have the Tx/Rx direction combination set to no-TDM in the DU NA resource, the DU is operable.

3) DU Soft Resource with AI Indication

In the DU soft resource indicated that the DU is usable by AI-DCI (e.g., DCI format 2_5), priority may be given to the operation of the DU. Accordingly, in such a resource, it is possible to determine the operation resources of the DU and the MT as in the DU hard resource.

4) DU Soft Resource without AI Indication

In a DU soft resource that is not indicated to be usable to the DU by the AI-DCI (e.g., DCI format 2_5), priority may be given to the operation of the MT. Accordingly, in these resources, it is possible to determine the operation resources of the DU and MT as in the DU NA resource.

Alternatively, in this resource, the MT may determine its own operation resource as in the DU NA resource. In these resources, the DU can operate if 'the MT can operate by determining its own operation resource as in the DU NA resource'. Otherwise, the DU is inoperable.

Figure 23:
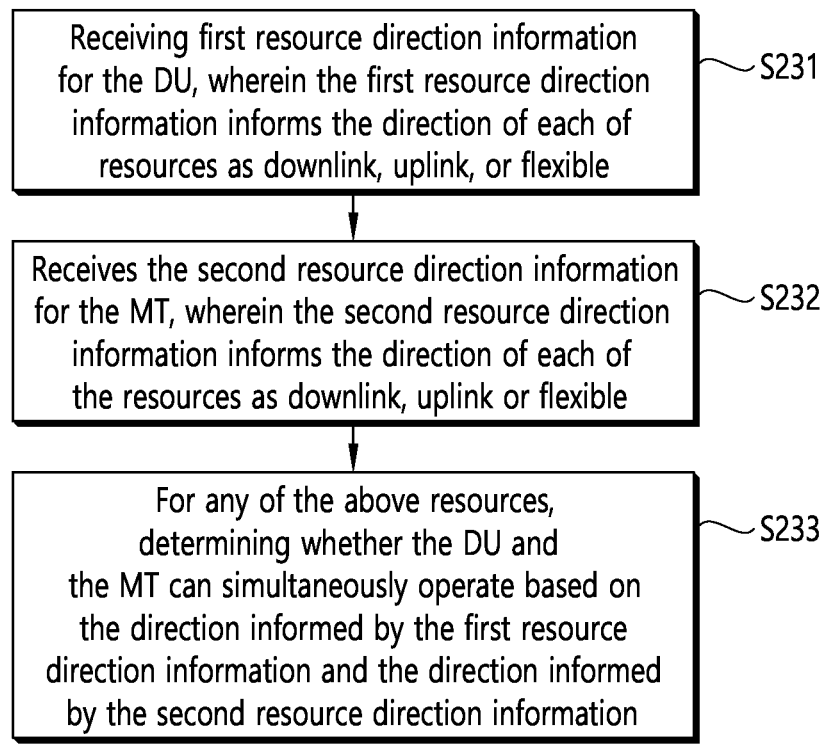
FIG. 23 illustrates a first operating method of an integrated access and backhaul (IAB) node including a distributed unit (DU) and a mobile terminal (MT) in a wireless communication system.

FIG. 23 illustrates a first operating method of an integrated access and backhaul (IAB) node including a distributed unit (DU) and a mobile terminal (MT) in a wireless communication system.

Referring to FIG. 23, the IAB node receives first resource direction information for the DU, and the first resource direction information informs the direction of each of resources as downlink, uplink, or flexible (S231). For example, the IAB node may receive/be provided first resource direction information from a centralized unit (CU) or a parent node through an F1-AP (application protocol). As will be described later, the IAB node may also receive resource attribute information for the DU.

The IAB node receives the second resource direction information for the MT, and the second resource direction information informs the direction of each of the resources as downlink, uplink or flexible (S232). The IAB node may receive/be provided second resource direction information from, for example, a parent node or a centralized unit (CU) through an RRC message. For a resource known to be flexible, information indicating a slot format (DCI format 2_0) may be additionally received/provided from a parent node.

For any of the above resources, the IAB node determines whether the DU and the MT can simultaneously operate based on the direction informed by the first resource direction information and the direction informed by the second resource direction information (S233).

More specifically, it can operate as follows.

The IAB node further receives resource attribute information for the DU, and the resource attribute information informs each of the resources as hard, soft, or unavailable (NA).

At this time, irrespective of a specific resource being informed as the hard, the soft and the unavailable, if a direction informed by the first resource direction information and a direction informed by the second resource direction information is predetermined specific directions, the DU and the MT can simultaneously operate in the specific resource.

On the other hand, if the direction indicated by the first resource direction information and the direction indicated by the second resource direction information in the specific resource are not predetermined specific directions, the DU and the MT cannot operate at the same time.

Specifically, if the specific resource is informed as a hard and the direction informed by the first resource direction information and the direction informed by the second resource direction information are not the predetermined specific directions, only the DU is operable in the specific resource.

If the specific resource is informed as a soft and the specific resource is informed to be usable by the DU (e.g., via DCI format 2_5), and the direction informed by the first resource direction information and the direction informed by the second resource direction information are not the predetermined specific directions, only the DU is operable in the specific resource.

If the specific resource is informed as a soft and the specific resource is not informed to be usable by the DU and the direction informed by the first resource direction information and the direction informed by the second resource direction information are not the predetermined specific directions, the DU is operable when the MT does not operate in the specific resource.

If the specific resource is informed as unavailable (NA) and the direction informed by the first resource direction information and the direction informed by the second resource direction information are not the predetermined specific directions, only the MT is operable in the specific resource.

That is, in the first operation method, when the direction indicated by the first resource direction information and the direction indicated by the second resource direction information for a specific resource are not the predetermined specific directions, either one of the DU and the MT operates, and in this case, the operation is performed as follows.

A specific resource (e.g., a symbol in a slot of an IAB-DU serving cell) may be configured as a hard, soft, or unavailable type (=H/S/NA) for the transmission direction. When the downlink, uplink or flexible (=D/U/F) symbol is set to hard, the IAB-DU serving cell may perform one of i) transmission, ii) reception, or iii) transmission or reception in the symbol, respectively.

When the downlink, uplink or flexible symbol is set to soft, the IAB-DU may perform one of i) transmission, ii) reception, or iii) transmission or reception in the symbol, respectively, only in the following cases.

1) When IAB-MT does not transmit or receive in the symbol, or 2) when the IAB-MT will transmit/receive in the symbol and the transmission/reception of the IAB-MT in the symbol is not changed due to the use of the symbol in the IAB-DU, 3) when the IAB-MT detects DCI format 2_5 having an AI index field value indicating that the symbol is usable.

On the other hand, if the symbol is set to unavailable (=NA), the IAB-DU does not transmit or receive the symbol.

Meanwhile, in the first operating method described above, regardless of whether the attribute of the resource is H (hard)/S (soft)/NA (not available), simultaneous operation of the DU and MT was possible if the DU and the MT had a specific resource direction determined to be capable of simultaneous operation.

In the second operation method, unlike the first operation method, simultaneous operation of DU and MT is not allowed in a resource whose resource attribute is NA, simultaneous operation of the DU and the MT is possible when the DU and the MT have a specific resource direction that is determined to be capable of simultaneous operation only in the resource of which the resource attribute is H/S. That is, in the NA resource, the conventional method (DU does not operate in the NA resource) is followed, and in the hard and soft resources, the above-described first operation method is followed. That is, the second operation method is a method in which the first operation method is applied only to hard and soft resources and follows the legacy method for NA resources.

In the third operation method, unlike the first operation method, simultaneous operation of the DU and the MT is not allowed in a resource whose resource attribute is H/NA, simultaneous operation of the DU and the MT is possible when the DU and the MT have a specific resource direction that is determined to be capable of simultaneous operation only in the resource whose resource attribute is S.

That is, in the H/NA resource, the existing scheme (DU operates on hard resources but MT doesn't operate, DU doesn't operate on NA resources) is followed. In the soft resource, the first operation method described above is followed. That is, the third operation method is a method in which the first operation method is applied only to soft resources and follows the legacy method for H/NA resources.

Figure 24:
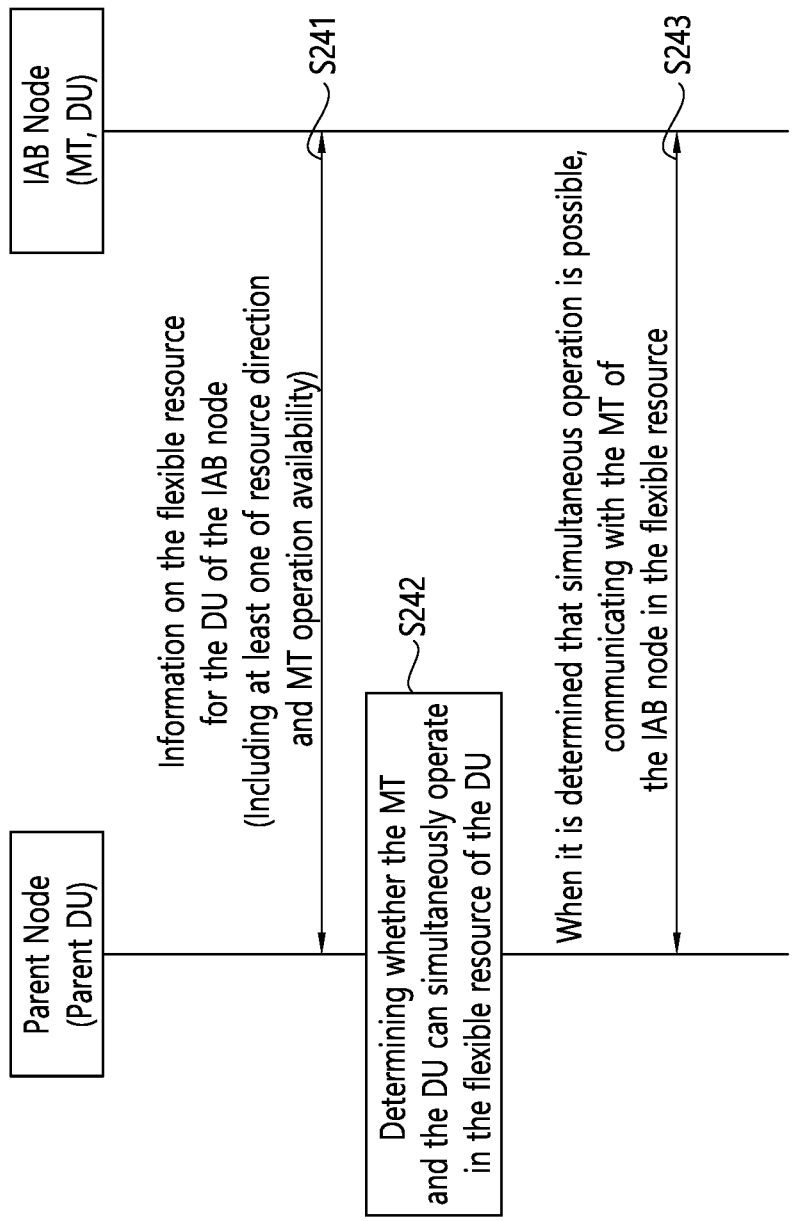
FIG. 24 illustrates simultaneous operation in a DU flexible resource.

FIG. 24 illustrates simultaneous operation in a DU flexible resource.

Referring to FIG. 24, an IAB node includes an MT and a DU, and a parent node includes at least a DU. the DU of the parent node is referred to as a parent DU in order to distinguish it from the MT and DU of the IAB node.

The IAB node may inform the parent node of information on the flexible resource for the DU (S241). The information on the flexible resource may inform the direction of the resource in the flexible resource of the DU (i.e., whether it is downlink or uplink) through MAC CE or the like.

Alternatively, the information on the flexible resource may indicate whether an MT is operable in the flexible resource.

The parent node (specifically, the parent DU) determines whether the MT and the DU can simultaneously operate in the flexible resource of the DU based on the information on the flexible resource (S242).

When it is determined that simultaneous operation is possible, the parent node communicates with the MT of the IAB node in the flexible resource (S243).

It may not be assumed that the MT knows the Tx/Rx direction information actually applied by the DU in the flexible resource of the DU, or it may not be able to inform the parent node of the resource direction information for the flexible resource of the DU. Considering this case, it may be stipulated that the MT does not always operate in the flexible resource of the DU. That is, it is determined that the flexible resource of the DU is a resource in which simultaneous operation of the MT and the DU is not allowed. This method has an advantage in that the operation mechanism is simple and the possibility of error occurrence is reduced. The operation method of the DU and MT in the flexible resource of the DU will be described in more detail in Section A.3 below.

(1) MT Resource Availability Determination Method

Figure 25:
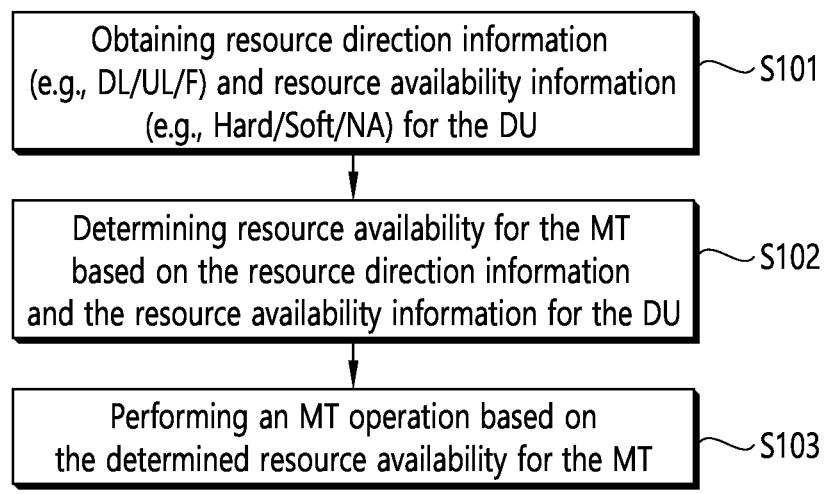
FIG. 25 is an example of a method for determining resource availability of an MT.

FIG. 25 is an example of a method for determining resource availability of an MT.

Referring to FIG. 25, the IAB node obtains resource direction information (e.g., DL/UL/F) and resource availability information (e.g., hard/soft/NA) for the DU (S101), resource availability for the MT is determined based on the resource direction information and the resource availability information for the DU (S102). An MT operation is performed based on the determined resource availability for the MT (S103).

If SDM/FDM between MT and DU in the same IAB node (or co-located) is possible, using the resource direction information (DL/UL/F) and resource availability information (hard/soft/NA) of the DU, it is possible to determine the resource availability of the MT as follows.

Alt 1.

When a specific resource (e.g., a specific symbol) is an NA/hard/soft resource based on the DU, the operational availability of the MT in the corresponding resource (in the corresponding symbol) may be determined as follows. At this time, in the present disclosure, only some of the following conditions may be applied to determine the availability of the MT. For example, only the conditions that enable the operation of the MT among the following are applied, and in the remaining resources, it may be determined that the operation of the MT is impossible. Or, for example, applying only the conditions that make the operation of the MT impossible among the following, and in the remaining resources, it may be determined that the operation of the MT is possible.

In the case of the NA resource of the DU, it is determined that the MT operation is possible in the corresponding resource.

In the case of a hard resource of the DU, 1) If the DU has a DL direction, if the MT is UL in the corresponding resource, it is determined that the operation of the MT is possible. If the MT is DL in the corresponding resource, it is determined that the operation of the MT is impossible. 2) If the DU has the UL direction, it is determined that the MT can operate if the MT is DL in the corresponding resource. If the MT is UL in the corresponding resource, it is determined that the operation of the MT is impossible. 3) If the DU has a flexible direction, i) the DU implicitly determines its own resource direction in the corresponding resource, so it may be difficult for the MT and the parent node to know the resource direction information of the DU. Therefore, it is determined that the operation of the MT in the corresponding resource is impossible. Alternatively, ii) the resource direction of the DU may be determined so that the DU implicitly enables SDM/FDM based on the resource direction of the MT in the corresponding resource. Therefore, it is determined that the operation of the MT is possible in the corresponding resource.

The operation method of DU and MT in the DU flexible resource is described in more detail in section A.3 below, and this method may be applied.

In the case of a DU soft resource: 1) If the corresponding DU resource is not indicated as IA, it is determined that MT operation is possible on the corresponding resource.

2) If the DU resource is indicated by IA, i) if the DU has a DL direction, it is determined that the operation of the MT is possible if the MT is UL in the corresponding resource, if the MT is DL in the corresponding resource, it is determined that the operation of the MT is impossible.

ii) if the DU has a UL direction, if the MT is DL in the corresponding resource, it is determined that the operation of the MT is possible, if the MT is UL in the corresponding resource, it is determined that the operation of the MT is impossible.

iii) If the DU has a flexible direction, the DU implicitly determines its own resource direction in the corresponding resource, so it may be difficult for the MT and the parent node to know the resource direction information of the DU. Therefore, it is determined that the operation of the MT in the corresponding resource is impossible. Alternatively, the resource direction of the DU may be determined so that the DU implicitly enables SDM/FDM based on the resource direction of the MT in the corresponding resource. Therefore, it is determined that the operation of the MT is possible in the corresponding resource.

The operation method of DU and MT in the DU flexible resource is described in more detail in section A.3 below, and this method may be applied.

Alt 2.

Even when SDM/FDM between the DU and the MT is allowed, a resource for allowing only the DU or the MT to operate may be required due to a problem such as power sharing. Considering this case, when a specific resource (e.g., a specific symbol) is an NA/hard/soft resource based on DU, the operational availability of the MT in each corresponding resource (in the corresponding symbol) may be determined as follows. At this time, in the present disclosure, only some of the following conditions may be applied to determine the availability of the MT. For example, only the conditions that enable the operation of the MT among the following are applied, and in the remaining resources, it may be determined that the operation of the MT is impossible. Or, for example, only the conditions that make the operation of the MT impossible among the following are applied, and in the remaining resources, it may be determined that the operation of the MT is possible.

1) In the case of the NA resource of the DU, it is determined that the MT operation is possible in the corresponding resource.

2) In the case of a hard resource of the DU, it is determined that the operation of the MT is impossible in the corresponding resource.

3) In the case of a soft resource of the DU, if the corresponding DU resource is not indicated by IA, it is determined that MT operation is possible on the corresponding resource. If the DU resource is indicated by IA, i) if the DU has a DL direction, it is determined that the operation of the MT is possible if the MT is UL in the corresponding resource, and if the MT is DL in the corresponding resource, it is determined that the operation of the MT is impossible. ii) If the DU has the UL direction, it is determined that the MT can operate if the MT is DL in the corresponding resource, and if the MT is UL in the corresponding resource, it is determined that the operation of the MT is impossible. iii) If the DU has a flexible direction, the DU implicitly determines its own resource direction in the corresponding resource, so it may be difficult for the MT and the parent node to know the resource direction information of the DU. Therefore, it is determined that the operation of the MT in the corresponding resource is impossible. Alternatively, the resource direction of the DU may be determined so that the DU implicitly enables SDM/FDM based on the resource direction of the MT in the corresponding resource. Therefore, it is determined that the operation of the MT is possible in the corresponding resource.

The operation method of DU and MT in the DU flexible resource is described in more detail in section A.3 below, and this method may be applied.

When Alt 1 is applied to both the resource availability determination method of the MT and the resource availability determination method of the DU, it may means that MT and DU can operate simultaneously if the MT and DU have resource directions in which simultaneous operation is possible regardless of H/S/NA.

When Alt 1 and Alt 2 are respectively applied to the resource availability determination method of the MT and the resource availability determination method of the DU, MT and DU can operate simultaneously in hard and soft resources, if the MT and DU have a resource direction that allows simultaneous operation, and simultaneous operation is not possible in the NA resource, which means that it operates as in legacy (i.e., DU does not transmit/receive).

When Alt 2 is applied to both the resource availability determination method of the MT and the resource availability determination method of the DU, MT and DU can operate simultaneously in soft resources if the MT and DU have a resource direction that allows simultaneous operation, and simultaneous operation is impossible in hard and NA resources, which means that it operates as legacy.

The method of determining the resource availability of the MT using the resource direction information (DUUU/F) and the resource availability information (hard/soft/NA) of the DU as described above may be applied in the following units.

1) It can be determined and applied in units of OFDM symbols of MT. That is, it is possible to determine and apply the resource availability of the MT for each OFDM symbol of the MT. In this case, when a partial region of the MT symbol is unavailable, it may be determined that the entire OFDM symbol is unavailable.

2) The resource direction of the MT may be determined and applied in units of the same continuous symbol area. That is, when some or all time domains (part or all symbol areas) are unavailable for consecutive symbol areas having the same resource direction from the MT viewpoint, it may be determined that the entire corresponding area is unavailable. Characteristically, this determination may be limited to within the same slot. That is, in the same slot, the resource direction of the MT may be determined and applied in units of the same continuous symbol region.

(2) Information Necessary for the Parent Node to Determine the Resource Availability of the MT When SDM/FDM is possible between the MT and the DU, the IAB node may report this information (information indicating that SDM/FDM is possible between the MT and the DU) to the parent node. That is, whether TDM or SDM/FDM is possible between the MT and the DU may be reported to the parent node. This helps the parent node to determine a resource capable of transmitting and receiving data to the MT.

Alternatively, the IAB node may report available and/or unavailable resource information for the operation of the MT to the parent node. At this time, available and/or unavailable resource information may be determined through the same method as (1) of section A.2 above.

(3) DU Resource Availability Determination Method

If SDM/FDM between MT and DU within the same IAB node (or co-located) is possible, using the resource direction information (DL/ULF) and resource availability information (hard/soft/NA) of the DU, it is possible to determine the resource availability of the DU as follows.

Alt 1.

When a specific resource (a specific symbol) is an NA/hard/soft resource based on the DU, the operational availability of the DU in each corresponding resource may be determined as follows.

1) In the case of a hard resource of the DU, it is determined that the operation of the DU is possible in the corresponding resource.

2) In the case of the NA resource of the DU, if the MT has a DL direction in the resource, if the DU is UL in the corresponding resource, it is determined that the DU operation is possible, and if the DU is DL in the corresponding resource, it is determined that the DU operation is impossible. If the MT has a UL direction in the corresponding resource, it is determined that the DU operation is possible when the DU is DL in the corresponding resource, and it is determined that the DU operation is impossible when the DU is UL in the corresponding resource. If the DU has a flexible direction, if the resource direction of the DU is set to be the same as the resource direction of the MT in the corresponding resource, it is determined that the operation of the DU is possible. Otherwise, it is determined that the operation of the DU is impossible. Alternatively, it is always determined that the operation of the DU is impossible. This is because it may be difficult to dynamically determine the direction of the corresponding resource and determine whether it is usable by comparing it with the resource direction of the MT.

3) In the case of a DU soft resource, if the DU resource is indicated by IA, it is determined that the DU operation is possible on the corresponding resource. In the case of the corresponding DU resource not being indicated as IA, i) if the MT has a DL direction in the corresponding resource, if the DU is UL in the corresponding resource, it is determined that the DU operation is possible, and if the DU is DL in the corresponding resource, it is determined that the operation of the DU is impossible. ii) If the MT has the UL direction in the resource, it is determined that the operation of the DU is possible if the DU is DL in the resource, and if the DU is UL in the corresponding resource, it is determined that the operation of the DU is impossible. iii) If the MT has a flexible direction in the corresponding resource, if the resource direction of the DU is set to be the same as the resource direction of the MT in the corresponding resource, it is determined that the DU operation is possible. Otherwise, it is determined that the operation of the DU is impossible. Alternatively, since it may be difficult to dynamically determine the direction of the corresponding resource and determine whether it is usable by comparing the direction of the resource with the direction of the MT, it is always determined that the operation of the DU is impossible.

The operation method of DU and MT in the DU flexible resource is described in more detail in section A.3 below, and this method may be applied.

Alt 2.

When a specific resource (e.g., a specific symbol) is an NA/hard/soft resource based on the DU, the operational availability of the DU in each corresponding resource may be determined as follows.

1) In the case of a hard resource of the DU, it is determined that the operation of the DU is possible in the corresponding resource.

2) In the case of the NA resource of the DU, it is determined that the operation of the DU is impossible in the corresponding resource.

3) In the case of a soft resource of the DU, if the DU resource is indicated by IA, it is determined that the DU operation is possible on the corresponding resource. If the DU resource is not indicated as IA, if the MT has a DL direction in the resource, if the DU is UL in the resource, it is determined that the DU operation is possible, and if the DU is DL in the corresponding resource, it is determined that the operation of the DU is impossible. If the MT has a UL direction in the corresponding resource, it is determined that the DU operation is possible if the DU is DL in the corresponding resource, and if the DU is UL in the corresponding resource, it is determined that the operation of the DU is impossible. If the MT has a flexible direction in the corresponding resource, if the resource direction of the DU is set to be the same as the resource direction of the MT in the corresponding resource, it is determined that the operation of the DU is possible. Otherwise, it is determined that the operation of the DU is impossible. Alternatively, since it may be difficult to dynamically determine the direction of the corresponding resource and determine whether it is usable by comparing the direction of the resource with the direction of the MT, it is always determined that the operation of the DU is impossible.

The operation method of DU and MT in the DU flexible resource is described in more detail in section A.3 below, and this method may be applied.

A.3. Simultaneous Operation in DU Flexible Resource

The MT of the IAB node receives its D/U/F resource configuration from the CU (e.g., via RRC), and the slot format for the flexible resource can be configured from the parent-DU (e.g., via DCI 2_0).

The DU of the IAB node may receive its D/U/F resource configuration and H/S/NA configuration from the CU (e.g., via F1-AP).

The D/U/F resource configuration and H/S/NA configuration of the IAB-DU are shared by the parent-DU of the IAB node. Therefore, the parent-DU can know which D/U/F resource configuration and which H/S/NA configuration the DU of the IAB node has.

<An Example of TDM Operation of IAB>

The TDM operation of the IAB described herein may be combined with the simultaneous operation-related content to be described later.

A symbol in a slot of an IAB-DU serving cell may be set to a hard, soft, or unavailable type (=H/S/NA). When the downlink, uplink, or flexible (=D/U/F) symbol is set to hard, the IAB-DU serving cell performs one of i) transmission, ii) reception, or iii) transmission or reception in the symbol, respectively.

If the downlink, uplink, or flexible symbol is set to soft, the IAB-DU may perform one of i) transmission, ii) reception, or iii) transmission or reception on the symbol, respectively, in the following cases.

1) IAB-MT does not transmit or receive in the symbol, or 2) when the IAB-MT will transmit/receive in the symbol and the transmission/reception of the IAB-MT in the symbol is not changed due to the use of the symbol of the IAB-DU. 3) When the IAB-MT detects DCI format 2_5 having an AI index field value indicating that the symbol is usable.

On the other hand, if the symbol is set to unavailable (=NA), the IAB-DU does not transmit or receive in the symbol.

Considering the TDM operation of Rel-16 IAB, since the parent-DU knows the H/S/NA configuration of the IAB-DU, the parent-DU can determine when the IAB-MT can transmit/receive with itself and when it cannot transmit/receive.

Considering the simultaneous operation between the DU and the MT of the IAB node, when an IAB node is capable of simultaneous Tx/Tx (i.e., DU of IAB node operates Tx/MT of IAB node operates Tx) and Rx/Rx (i.e., DU of IAB node operates Rx/MT of IAB node operates Rx), since the parent node knows the H/S/NA configuration and UD configuration of the IAB-DU, whether the IAB-MT can operate simultaneously with the IAB-DU (that is, whether the IAB-MT and the IAB-DU have a resource direction capable of simultaneous operation) can be determined. Therefore, in a resource in which LAB-MT and IAB-DU are Tx/Tx or Rx/Rx, it can be determined that the parent-DU can transmit/receive with the IAB-MT.

On the other hand, when the IAB-MT and the IAB-DU cannot operate simultaneously (e.g., when the IAB-MT and the IAB-DU do not have a resource direction capable of simultaneous operation), the TDM operation must be performed. In this case, it may be determined whether the IAB-DU or the IAB-MT operates through the H/S/NA configuration of the IAB-DU. Therefore, in this case, the parent-DU may determine that it cannot transmit/receive with the IAB-MT in the hard resource and may determine that it may transmit/receive with the IAB-MT in the NA resource.

Figure 26:
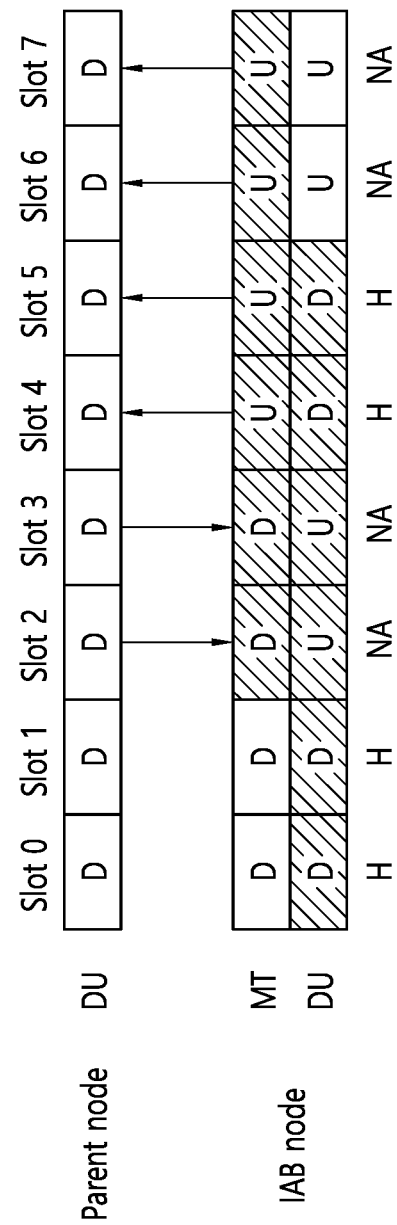
FIG. 26 illustrates a resource capable of simultaneous operation between a parent node and an IAB node.

FIG. 26 illustrates a resource capable of simultaneous operation between a parent node and an IAB node.

Referring to FIG. 26, the DU of the parent node (hereinafter, simply parent-DU) may determine the location of a resource in which the MT and DU of the IAB node have DL and UL directions, respectively, or have UL and DL directions. In such a resource, the MT and the DU of the IAB may perform simultaneous operation, and it may be determined that the IAB-MT can transmit/receive with itself. That is, it is possible to determine whether simultaneous operation of the IAB node is possible based on the resource transmission direction in the MT and the resource transmission direction in the DU of the IAB node at a specific time point.

This simultaneous operation may be combined with the TDM operation of the IAB described above. For example, the operation according to the present disclosure may be performed on the resource capable of the simultaneous operation, and the TDM operation of the IAB described above may be performed on the remaining resources except for the resource capable of the simultaneous operation.

Meanwhile, in the case of a resource in which the IAB-DU is flexible, the IAB-DU itself determines whether to use the flexible resource of the IAB-DU as the DL or UL. The MT within the same IAB-node may determine whether simultaneous operation of the IAB-MT and the IAB-DU is possible by sharing the actual resource direction information in the IAB-DU flexible resource through an internal interface. However, since the parent-DU does not know this information, it cannot determine whether it can transmit/receive with the IAB-MT.

Figure 27:
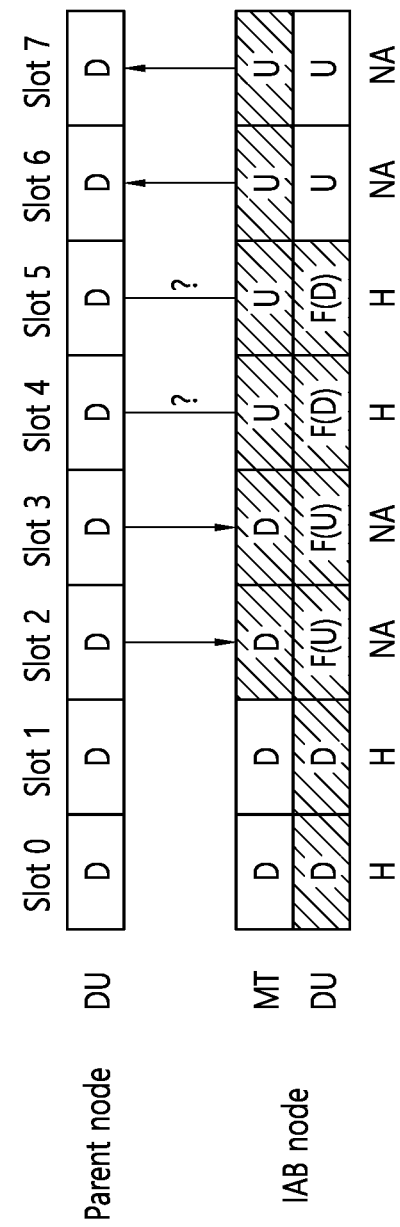
FIG. 27 shows an example of resource direction and resource availability in a parent node and an IAB node.

FIG. 27 shows an example of resource direction and resource availability in a parent node and an IAB node.

Referring to FIG. 27, resource directions of parent-DU, IAB-MT, and IAB-DU in slots 0 to 7 are shown. In this case, slots 2, 3, 4, and 5 of the IAB-DU are flexible slots, and the IAB-DU may determine to use each flexible slot as U, U, D, and D. In this case, all of slots 2, 3, 4, and 5 are resources capable of simultaneous operation of IAB-MT and IAB-DU.

However, from the point of view of the parent-DU, since slots 2 and 3 are NA resources, it is unknown whether the IAB-MT and the IAB-DU operate simultaneously. However, it is determined that the resources are available to the IAB-MT, and can perform transmission and reception with the IAB-MT. Since slots 4 and 5 are hard resources, the parent-DU can transmit/receive with the IAB-MT only when the IAB-MT has a direction in which simultaneous operation with the IAB-DU is possible. However, since the parent-DU does not know whether the IAB-DU performs DL or UL in the corresponding resource, it cannot determine whether transmission/reception with the IAB-MT is possible.

Therefore, it is necessary to clearly determine how the parent-DU determines whether transmission/reception with the IAB-MT is possible in the flexible resource of the IAB-DU.

For this, the following method is proposed.

Alt a. The IAB node may inform the parent node of simultaneous operation related information.

Alt a-1. In order to perform simultaneous operations of IAB-DU and IAB-MT in the flexible resource of the IAB-DU, the IAB node may inform the parent-DU of the resource direction in the DU flexible resource of the IAB-DU. That is, the IAB node may inform the parent-DU of intended resource direction information in the flexible resource. That is, information on whether the flexible resource of the IAB-DU is to be used by the IAB-DU as the DL or the UL may be provided. Alternatively, information on whether to use the flexible resource of the IAB-DU as the DL, the UL, or the flexible resource of the IAB-DU may be provided. Through this, the parent-DU may determine the resource direction of the IAB-DU and determine whether transmission/reception with the IAB-MT is possible.

Alt a-2. The IAB node may inform the parent node of whether simultaneous operation between the IAB-DU and the IAB-MT in the DU flexible resource of the IAB-DU is possible. More specifically, it is possible to inform whether simultaneous operation between IAB-DU and IAB-MT is possible in units of symbols or slots of the DU flexible resource. Through this, the parent-DU can determine that transmission/reception with the IAB-MT is possible in the resource informed that simultaneous operation is possible. In the resource informed that it is not possible, 1) it is determined that transmission and reception with IAB-MT is impossible, 2) it is determined that the IAB node operates in TDM, and it can be determined whether transmission and reception with the IAB-MT can be performed according to the existing TDM method.

This information may be transmitted by the IAB-DU to the parent-DU through signaling such as F1-AP (F1 Application Protocol), or by the IAB-MT through UCI, MAC signaling, or the like. The parent-DU may determine whether transmission/reception with the IAB-MT is possible in the flexible resource of the IAB-DU by using this information.

Alt b. A method for a parent node to control a resource direction in a flexible resource of an IAB-DU.

Alt b-1. The parent-DU may indicate by determining the resource direction in the IAB-DU flexible resource. This information may be transmitted by the parent-DU to the IAB-MT through DCI, MAC signaling, or the like. The IAB-DU uses this information to determine the resource direction in the flexible resource of the IAB-DU. The parent-DU may determine whether transmission/reception with the IAB-MT is possible, assuming that the IAB-DU operates according to the resource direction indicated by the parent-DU in the flexible resource of the IAB-DU.

Alt b-2. The parent-DU may determine and indicate whether to simultaneously operate the IAB-DU and the IAB-MT in the IAB-DU flexible resource. More specifically, it is possible to inform whether simultaneous operation between the IAB-DU and the IAB-MT is possible in units of symbols or slots of the IAB-DU flexible resource. When the parent node instructs to perform simultaneous operations, the IAB-DU determines its own resource direction so that simultaneous operation is possible according to the resource direction of the IAB-MT in the flexible resource. This information may be transmitted by the parent-DU to the IAB-MT through DCI, MAC signaling, or the like.

Alt c. A method of controlling the resource direction of the IAB-DU according to the resource direction of the IAB-MT.

Alt c-1. For the simultaneous operation between the IAB-DU and the IAB-MT, the resource direction may be set so that the IAB-DU can simultaneously operate. If the IAB-DU does not have a resource direction capable of simultaneous operation with the IAB-MT, the IAB-DU does not perform an operation on the corresponding resource. Therefore, the IAB-MT may determine that it is possible to operate in the IAB-DU flexible resource. In addition, the parent-DU may determine that it can transmit/receive with the IAB-MT regardless of the resource direction of the IAB-DU in the IAB-DU flexible resource.

Alt c-2. The IAB node may inform the parent node of whether IAB-MT can be operated in the flexible resource of the IAB-DU. More specifically, it is possible to inform whether the operation of the IAB-MT is possible (whether simultaneous operation between the IAB-DU and the IAB-MT is possible) in units of symbols or slots of the IAB-DU flexible resource. If the parent-DU is informed that the IAB-MT is operable in the flexible resource of the IAB-DU, the parent-DU may determine the corresponding resource as a resource that can be transmitted/received with the IAB-MT. The IAB-MT may also determine the corresponding resource as an operable resource. The IAB-DU sets/uses the resource direction to enable simultaneous operation with the IAB-MT in the corresponding resource. On the other hand, if the parent-DU is informed that the IAB-MT cannot be operated in the flexible resource of the IAB-DU, the parent-DU may determine the corresponding resource as a resource that cannot be transmitted/received with the LAB-MT. The IAB-MT may also determine the corresponding resource as a resource in which it cannot operate. The IAB-DU may set/use the resource direction without considering whether simultaneous operation with the IAB-MT is possible in the corresponding resource. This information may be transmitted by the IAB-MT to the parent-DU through DCI, MAC signaling, or the like.

Alt d. Simultaneous operation is not performed on the DU flexible resource. The IAB node does not perform simultaneous operations on a resource in which the IAB-DU is set to be flexible. That is, in the resource in which the IAB-DU is set to be flexible, the IAB node may perform only the TDM operation. In this case, the parent node determines that it cannot transmit/receive with the IAB-MT in the flexible resource of the IAB-DU. Characteristically, in a resource in which the IAB-DU is flexible and hard, the parent node determines that it cannot transmit/receive with the IAB-MT. In a resource in which the IAB-DU is flexible and NA, the parent node determines that it can transmit/receive with the IAB-MT.

The flexible resource of this IAB-DU may mean the following.

1) It means a resource configured to be flexible by the IAB-DU from the donor node/CU through the F1-AP. From a parent-DU perspective, resource direction information of IAB-DU may be shared from a donor node/CU through F1-AP. Through this, the resource means a resource configured to have an IAB-DU having a flexible direction.

2) The IAB-node may transmit its intended resource direction information for the IAB-DU flexible resource to the parent-DU as in Alt a-1 above. In this case, the flexible resource of the IAB-DU means a resource indicated as flexible through the intended resource direction and/or an IAB-DU flexible resource to which the intended resource direction information is not transmitted.

B. Multiple Carrier Operation

One or a plurality of CC (component carrier) exists in the DU and/or MT in the same IAB node (or co-located), and an applicable multiplexing scheme may be different according to a CC pair between the MT and the DU. In this section, the operation of DU and MT in this case is proposed.

B.1. MT Configurations

The resource direction (DL/UL/F) information of the MT is set through the MT configuration. Considering the environment in which multiple carriers exist in the MT, the MT configuration may be configured as follows.

Alt 1. MT configuration is MT specific, and one MT is configured with one MT configuration. When the MT has a plurality of CCs, the same MT configuration is applied to all carriers.

Alt 2. MT configurations may be set for each CC of the MT. That is, when the MT has a plurality of CCs, different CCs may receive different MT configurations. It is possible to simultaneously use different resource directions between MT-CCs located in a frequency domain that do not interfere with each other. Therefore, according to the decision of the parent node/CU, the MT-CC-specific MT configuration (resource direction pattern assignment) may be set.

B.2. DU Configurations

In this section, in an environment in which one or more CCs exist in a DU and/or MT in the same IAB node (or are co-located) and the DU has a plurality of child MTs, a DU configuration method is proposed.

Figure 28:
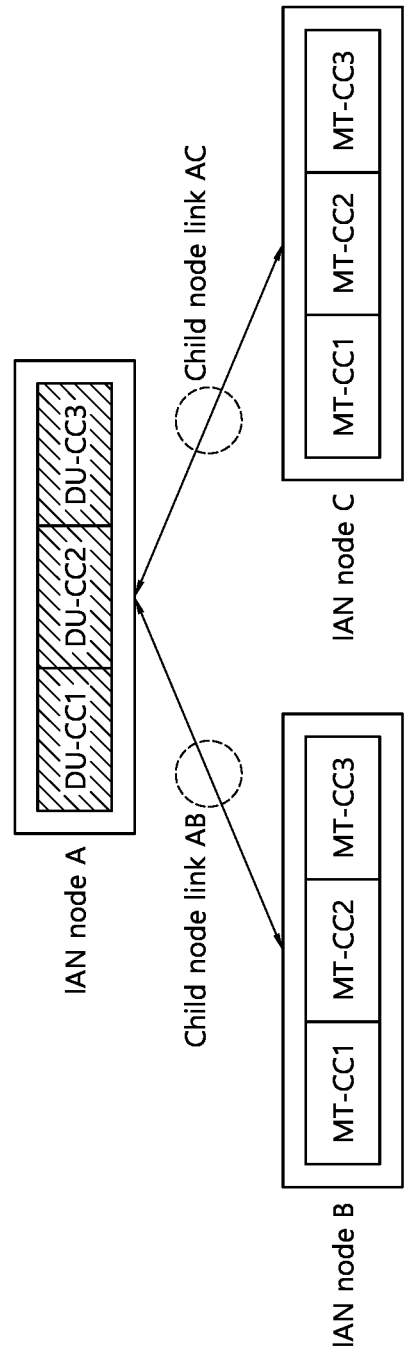
FIG. 28 illustrates IAB nodes in which a plurality of CCs exist.

FIG. 28 illustrates IAB nodes in which a plurality of CCs exist.

Referring to FIG. 28, an IAB node A may have an IAB node B and an IAB node C as child nodes. The DU of IAB Node A consists of three CCs: DU-CC1, DU-CC2, and DU-CC3, IAB Node B and IAB Node C may be configured with three CCs of MT-CC1, MT-CC2, and MT-CC3, respectively. In this case, the IAB node A may have a total of two child node links for each child node. For convenience, let the link between IAB node A and IAB node B be child node link AB of IAB node A, and let the link between IAB node A and IAB node C be child node link AC of IAB node A.

Through the DU configuration, resource direction (DL/UL/F) information and/or resource availability (hard/soft/NA) information of the DU are set. Considering the environment in which multiple carriers exist in the DU, the DU configuration may be configured as follows.

Alt 1. DU configuration is DU-specific, and one DU is configured with one DU configuration. When a DU has a plurality of CCs, the same DU configuration is applied to all carriers.

That is, in the example of FIG. 28, the same DU configuration is applied to the child node link AB and the child node link AC, and the same DU configuration is applied to DU-CCs in the same child node link.

Alt 2. DU configurations may be different, DU child node link specifically, for each DU child node link. If the DU has multiple CCs and has multiple child node links, for the same child node link, the same DU configuration is applied between different CCs. However, different DU configurations may be set between different child node links. Characteristically, although the resource direction configuration of the DU is the same for different DU child node links, only the resource availability configuration of the DU may be set differently.

That is, in the example of FIG. 28, different DU configurations may be applied between the child node link AB and the child node link AC. However, the same DU configuration is applied to DU-CCs in the same child node link.

In this case, the network may set whether the DU configuration is DU-specific or DU child node-specific. That is, the DU may be configured to determine whether the DU configuration is DU-specific or DU child node-specific.

Alt 3. DU configuration may be configured for each CC of the DU. That is, when a DU has a plurality of CCs, different CCs may receive different DU configurations. It is possible to simultaneously use different resource directions between DU-CCs located in a frequency domain that do not interfere with each other. Therefore, according to the decision of the parent node/CU, the DU configuration (resource direction pattern allocation) may be configured specifically for the DU-CC. In this case, the same DU configuration between different DU child node links may be additionally applied to the same DU-CC.

Characteristically, although the resource direction configuration of the DU is the same for different DU-CCs, only the resource availability configuration of the DU may be set differently.

Alternatively, characteristically, the resource availability configurations of the DUs may be the same for different DU-CCs, but only the resource direction configurations of the DUs may be set differently. Through this, activation/deactivation of DUs for each CC can be performed through DU configuration.

That is, in the example of FIG. 28, different DU configurations may be configured between different DU-CCs. In this case, the same DU configuration may be applied between the child node link AB and the child node link AC for the same DU-CC.

In this case, the network may configure whether the DU configuration is DU-specific or DU-CC-specific. That is, the DU may be configured to determine whether the DU configuration is DU-specific or DU-CC-specific.

Alt 3-1. The DU configuration may be configured for each BWP of the DU. That is, when a DU has a plurality of BWPs, different BWPs may receive different DU configurations. It is possible to simultaneously use different resource directions between BWPs in a DU located in a frequency domain that do not interfere with each other. Therefore, according to the decision of the parent node/CU, the DU configuration (resource direction pattern allocation) may be specifically configured for the BWP of the DU. In this case, the same DU configuration between different DU child node links may be additionally applied to the same BWP.

Characteristically, with respect to the BWPs of different DUs, the resource direction configurations of the DUs are the same, but only the resource availability configurations of the DUs may be set differently.

Alternatively, for BWPs of different DUs, the resource availability configurations of the DUs may be the same, but only the resource direction configurations of the DUs may be set differently.

The network may configure whether the DU configuration is DU-specific or DU BWP-specific. That is, the DU may receive from the network whether the DU configuration is DU-specific or DU BWP-specific.

Alt 4. DU configuration is DU child node link-specific and can be configured specifically for DU-CC. For example, different DU configurations may be set for each {DU child node link, DU-CC} combination. In this case, characteristically, for the identical DU-CCs, DU configurations between different DU child node links may be configured as follows.

1) DU resource direction configuration and DU resource availability configuration may be set differently. 2) Although the resource direction configuration of the DU is the same, only the resource availability configuration of the DU may be set differently.

Also, characteristically, for the same DU child node link, the DU configuration between different DU-CCs may be configured as follows.

1) DU resource direction configuration and DU resource availability configuration may be set differently. 2) Although the resource direction configuration of the DU is the same, only the resource availability configuration of the DU may be set differently. 3) The resource availability configuration of the DU may be the same, but only the resource direction configuration of the DU may be set differently.

That is, in the example of FIG. 28, different (independent) DU configurations may be configured between different DU-CCs in the same child node link. Also, different (independent) DU configurations may be configured between the child node link AB and the child node link AC for the same DU-CC.

As a more specific example, in FIG. 28, the DU resource direction configuration is configured for each DU-CC, and different (independent) DU resource direction configurations may be configured for DU-CC1, DU-CC2, and DU-CC3. On the other hand, since the DU resource availability configuration is set for each DU child node link, different (independent) DU resource availability configurations may be set between the child node link AB and the child node link AC. In this case, different DU child node links for the same DU-CC may have the same DU resource direction configuration but different DU resource availability configurations. For the same DU child node link, different DU-CCs may have the same DU resource availability configuration but different DU resource direction configurations.

In this case, the network may set whether the DU configuration is DU-CC specific or DU child node specific. That is, the DU may receive from the network whether the DU configuration is DU-CC specific or DU child node specific.

B.3. How to Determine Resource Availability of IAB Nodes

In this section, when one or more CCs exist between DUs and/or MTs in the same IAB node (or are co-located), a method of determining available resources of DU and MT based on DU configuration and MT configuration is proposed.

In this section, when one or more CCs exist between DUs and/or MTs in the same IAB node (or are co-located), different multiplexing schemes may be applied according to {DU-CC, MT-CC} pairs. One multiplexing scheme among TDM, SDM/FDM, and/or FD may be applied between the specific CC of the MT and the specific CC of the DU. Since the multiplexing scheme applied according to the {DU-CC, MT-CC} pair may be different, the available resources of the MT may be different according to the MT-CC.

From an MT point of view, a resource capable of operating a specific MT-CC may be determined as follows.

(a) First, from the viewpoint of a specific MT-CC, an unavailable resource (let's call this a NULL resource) is determined for each DU-cell of a DU within the same IAB node (or co-located).

(b) If it is determined as in (a) that the specific resource of a specific MT-CC is a NULL resource for at least one DU-cell, the resource of the corresponding MT-CC is determined as a NULL resource. Otherwise, that is, if it is not a NULL resource for all DU-cells, the resource of the corresponding MT-CC is determined as an available resource.

At this time, from the viewpoint of a specific MT-CC, a method of determining whether a resource is available (i.e., whether a NULL resource) for a specific DU-cell within the same IAB node (or co-located) may follow the method of section A. That is, the operable resource of the MT-CC and the operable resource of the DU-cell in the corresponding MT-CC/DU-cell pair may be determined based on the multiplexing type for a specific MT-CC/DU-cell pair. From the viewpoint of a specific MT-CC, when a specific resource is available for all MT-CC/DU-cell pairs, the corresponding resource may be used for the operation of the corresponding MT-CC.

From the point of view of the DU, a resource capable of operating a specific DU-cell may be determined as follows.

(a) First, from the viewpoint of a specific DU-cell, available resources are determined for each MT-CC of an MT in the same IAB node (or co-located).

(b) If it is determined as in (a) that the specific resource of the specific DU-cell is available for all MT-CCs, the resource of the corresponding DU-cell is determined as the usable resource.

In this case, a method of determining whether a resource is available for a specific MT-CC within the same IAB node (or co-located) from the viewpoint of a specific DU-cell may follow the method of section A above. That is, the operable resource of the MT-CC and the operable resource of the DU-cell in the corresponding MT-CC/DU-cell pair may be determined based on the multiplexing type for a specific MT-CC/DU-cell pair. When a specific resource is available for all MT-CC/DU-cell pairs from the viewpoint of a specific DU-cell, the resource may be used for the operation of the corresponding DU-cell.

More specifically, it may be as follows.

1) When MT-CC and DU-CC Operate in TDM,

Alt 1. When a specific DU resource is set as a hard resource for at least one DU child node link, the resource is determined as a NULL resource of the MT. Alternatively, if a soft resource with IA for at least one DU child node link is set, the resource is determined as a NULL resource of the MT. Otherwise, the MT determines that it is an available resource.

Alt 2. From the point of view of a specific DU-CC, the DU availability configuration is set in common for all DU child node links, and additionally, the resource set as a DU child node specific hard resource through the child node specific NA configuration can be changed to an NA resource. In this case, i) if a specific DU resource is set as a hard resource by the DU availability configuration common to the DU child node links, the resource is determined as a NULL resource of the MT. Or ii) when a specific DU resource is set as a hard resource by the DU availability configuration common to the DU child node links, if at least one DU child node link is set (maintained) as a hard resource (that is, if all DU child node links are not set to NA through child node-specific NA configuration), the resource is determined as a NULL resource of the MT.

Alternatively, if a specific DU resource is set as a soft resource with at least IA, the resource is determined as a NULL resource of the MT. Otherwise, the MT determines that it is an available resource.

Alt 3. From the perspective of a specific DU-CC, the DU availability configuration is set to be common to all DU child node links, in addition, resources set as hard or soft resources specifically for DU child nodes through child node-specific NA configurations may be changed to NA resources. In this case, i) for a specific DU resource, 'when set as a hard resource by the DU availability configuration common to the DU child node links' or 'when set as a soft resource and received an IA instruction from the parent node', the corresponding resource is determined as a NULL resource of the MT. Otherwise, the MT determines that it is an available resource. ii) When a specific DU resource is set as a hard resource by the DU availability configuration common to the DU child node links, if at least one DU child node link is set (maintained) as a hard resource (that is, if all DU child node links are not set to NA through child node-specific NA configuration), the resource is determined as a NULL resource of the MT. When a specific DU resource is set as a soft resource by the DU availability configuration common to the DU child node links, if at least one DU child node link is set (maintained) as a soft resource (i.e., all DU child node links are not set to NA through child node-specific NA configurations) and an IA instruction is received from the parent node, the corresponding resource is determined as a NULL resource of the MT. Otherwise, the MT determines that it is an available resource.

2) When MT-CC and DU-CC Operate in SDM/FDM.

Alt 1. When a specific DU resource is set as a hard resource or as a soft resource with IA for at least one DU child node link, if the direction (DL/UL) of the corresponding DU child node link is the same as the link direction (DL/UL) of the MT (that is, when the direction of the DU child node link and the link direction of the MT-CC are both DL or UL), the corresponding resource is determined as a NULL resource of the MT. In this case, if the direction of the link of the corresponding DU child node is flexible, the corresponding resource may be determined as a NULL resource of the MT. Alternatively, if the direction of the DU child node link is flexible, it may be determined that the corresponding resource is always available to the MT.

Alt 2. From the point of view of a specific DU-CC, the DU availability configuration is set in common to all DU child node links, and additionally, through the child node specific NA configuration, the resource set as a DU child node specific hard resource can be changed to an NA resource.

In this case, Alt 2-1. When a specific DU resource is set as a hard resource by the DU availability configuration common to DU child node links, if the direction (DL/UL) of the corresponding DU child node link is the same as the link direction (DL/UL) of the MT (that is, when the direction of the DU child node link and the link direction of the MT-CC are both DL or UL), the resource is determined as a NULL resource of the MT. In this case, if the direction of the DU child node link is flexible, the resource may be determined as a NULL resource of the MT. Alternatively, if the direction of the DU child node link is flexible, it may be determined that the corresponding resource is always available to the MT.

Alt 2-2. When a specific DU resource is set as a hard resource by the DU availability configuration common to DU child node links, if at least one DU child node link is set (maintained) as a hard resource (i.e. all DU child node links are not set to NA via child node specific NA configurations), and if the direction of the DU child node link (DL/UL) is the same as the link direction (DL/UL) of the MT (that is, when the direction of the DU child node link and the link direction of the MT-CC are both DL or UL), the resource is determined as a NULL resource of the MT.

In this case, if at least one DU child node link is set (maintained) as a hard resource and the direction of the DU child node link is flexible (i.e. all DU child node links are not set to NA via child node specific NA configurations), the resource may be determined as a NULL resource of the MT. Alternatively, if at least one DU child node link is set (maintained) as a hard resource (i.e. all DU child node links are not set to NA via child node specific NA configurations) and the direction of the DU child node link is flexible, it may be determined that the resource is always usable by the MT.

Alternatively, when a specific DU resource is set as a soft resource with at least IA, if the direction (DL/UL) of the corresponding DU child node link is the same as the link direction (DL/UL) of the MT (that is, when the direction of the DU child node link and the link direction of the MT-CC are both DL or UL), the resource is determined as a NULL resource of the MT. In this case, if the direction of the corresponding DU child node link is flexible, the corresponding resource may be determined as a NULL resource of the MT. Alternatively, if the direction of the DU child node link is flexible, it may be determined that the corresponding resource is always available to the MT. Otherwise, the MT determines that it is an available resource.

Alt 3. From the point of view of a specific DU-CC, the DU availability configuration is set in common to all DU child node links, and additionally, the resource set as a DU child node specific hard or soft resource through the child node specific NA configuration can be changed to an NA resource.

In this case, Alt 3-1. When a specific DU resource is 'set as a hard resource by the DU availability configuration common to the DU child node links' or is 'set as a soft resource and receives an IA instruction from the parent node', if the direction (DL/UL) of the corresponding DU child node link is the same as the link direction (DL/UL) of the MT (that is, when the direction of the DU child node link and the link direction of the MT-CC are both DL or UL), the corresponding resource is determined as a NULL resource of the MT. In this case, if the direction of the DU child node link is flexible, the resource may be determined as a NULL resource of the MT. Alternatively, if the direction of the DU child node link is flexible, it may be determined that the corresponding resource is always available to the MT. Otherwise, the MT determines that it is an available resource.

Alt 3-2. When a specific DU resource is set as a hard resource by the DU availability configuration common to DU child node links, if at least one DU child node link is set (maintained) as a hard resource (i.e. all DU child node links are not set to NA via child node specific NA configurations), and if the direction of the DU child node link (DL/UL) is the same as the link direction (DU/UL) of the MT (that is, when the direction of the DU child node link and the link direction of the MT-CC are both DL or UL), the resource is determined as a NULL resource of the MT.

In this case, if at least one DU child node link is set (maintained) as a hard resource (i.e. all DU child node links are not set to NA via child node specific NA configurations) and the direction of the DU child node link is flexible, the resource may be determined as a NULL resource of the MT. Alternatively, if at least one DU child node link is set (maintained) as a hard resource (i.e. all DU child node links are not set to NA via child node specific NA configurations) and the direction of the DU child node link is flexible, it may be determined that the resource is always usable by the MT.

When a specific DU resource is set as a soft resource by the DU availability configuration common to the DU child node links, if at least one DU child node link is set (maintained) as a soft resource (i.e. all DU child node links are not set to NA via child node specific NA configurations) and receives an IA instruction from the parent node, and if the direction (DL/UL) of the DU child node link is the same as the link direction (DU/UL) of the MT (that is, when the direction of the DU child node link and the link direction of the MT-CC are both DL or UL), the resource is determined as a NULL resource of the MT.

When at least one DU child node link is set (maintained) as a soft resource (i.e. all DU child node links are not set to NA via child node specific NA configurations) and receives an IA instruction from the parent node, if the direction of the DU child node link is flexible, the resource may be determined as a NULL resource of the MT. Alternatively, if at least one DU child node link is set (maintained) as a soft resource (i.e. all DU child node links are not set to NA via child node specific NA configurations) and receives an IA instruction from the parent node, if the direction of the DU child node link is flexible, the resource may always be determined to be usable by the MT. Otherwise, the MT determines that it is an available resource.

3) When the MT-CC and the DU-CC Perform FD Operation, the MT can Always be Used Regardless of the Availability of the DU Resource.

The method for determining the resource availability of the MT as described above may be applied in the following units.

Alt 1. It can be determined and applied in units of OFDM symbols of MT. That is, the resource availability of the MT is determined and applied for each OFDM symbol of the MT. At this time, when a partial area of the MT symbol is unavailable, it is determined that the entire OFDM symbol is unavailable.

Alt 2. It can be determined and applied in units of the consecutive symbol region with the same MT resource direction. That is, for consecutive symbol regions with the same resource direction from the MT point of view, when some or all of the time domain (part or all of the symbol region) is unavailable, it is determined that the entire region is unavailable. Characteristically, this determination may be limited to within the same slot. That is, in the same slot, it can be determined and applied in units of the consecutive symbol region with the same resource direction of MT.

A method of determining resource availability of the MT-CC and the DU-cell in the IAB node may be as follows.

When a plurality of MT-CCs and a plurality of DU-cells exist in the IAB node, TDM or no-TDM operation for each combination of MT Tx/Rx and DU Tx/Rx directions for each MT-CC/DU-cell pair can be performed. TDM operation may mean non-simultaneous Tx/Rx operation, and no-TDM operation may mean simultaneous Tx/Rx operation.

A method of determining resource availability of a specific DU-cell within the IAB node may be as follows.

Alt 1. The DU-cell can determine its own resource availability according to hard/soft/NA information in the DU configuration it has configured. In this case, in the soft resource, resource availability may be determined based on AI information obtained by receiving AI-DCI. This operation may be the same as the DU operation of the Rel-16 IAB node considering that the existing DU and MT always operate based on TDM.

Alt 2. The DU-cell may determine the operable resource differently according to the TDM/no-TDM relationship with the MT-CC in the IAB node.

Considering the Tx/Rx direction of itself (DU-cell) and the Tx/Rx direction of the MT-CC, if an MT-CC in a TDM relationship with itself exists in a specific time resource, the DU-cell may determine its own resource availability according to hard/soft/NA information in the DU configuration it has configured. In this case, in the soft resource, resource availability may be determined based on AI information obtained by receiving AI-DCI. For example, when at least one MT-CC is in a TDM relationship with a DU-cell in a specific time resource, the DU-cell may determine the hard resource and the soft resource to which the AI instruction is received as operable resources, and the NA resource and the soft resource to which the AI instruction is not received as non-operable resources.

Considering the Tx/Rx direction of itself (DU-cell) and the Tx/Rx direction of the MT-CC, when there is no MT-CC in a TDM relationship with itself in a specific time resource, the DU-cell may determine the corresponding resource as a resource in which the DU-cell can operate. In this case, hard/soft/NA information of the set DU configuration and AI-DCI information of soft resources can be ignored. Alternatively, in this case, the DU-cell may treat all resources as hard resources regardless of the DU configuration (from the DU-cell point of view).

For example, if MT-CC1 and MT-CC2 exist in the IAB node, from the point of view of DU-Cell1 within the same IAB node, it operates in no-TDM with MT-CC1 in DU-Tx/MT-Tx and DU-Rx/MT-Rx directions, and in the DU-Tx/MT-Rx and DU-Rx/MT-Tx directions, no-TDM may be used. In addition, from the viewpoint of DU-Cell1, MT-CC2 may operate in no-TDM in the Tx/Rx direction of all DUs and MTs. In this case, in a specific time resource, DU-cell1 may have a DL Tx direction, and both MT-CC1 and MT-CC2 may have a DL Rx direction. In this case, in the corresponding resource, DU-cell1 is in a TDM relationship with MT-CC1 and has a no-TDM relationship with MT-CC2. Therefore, since there is an MT-CC in a TDM relationship with DU-Cell1, DU-Cell1 determines its own resource availability according to hard/soft/NA information in its DU configuration and AI information of soft resources. On the other hand, in other time resources, DU-cell1 may have a UL Rx direction, and both MT-CC1 and MT-CC2 may have a DL Rx direction. In this case, DU-cell1 is in a no-TDM relationship with both MT-CC1 and MT-CC2 in the corresponding resource. Therefore, since there is no MT-CC in a TDM relationship with DU-cell1, the DU-cell may determine the corresponding resource as a resource capable of operating on it.

Figure 29:
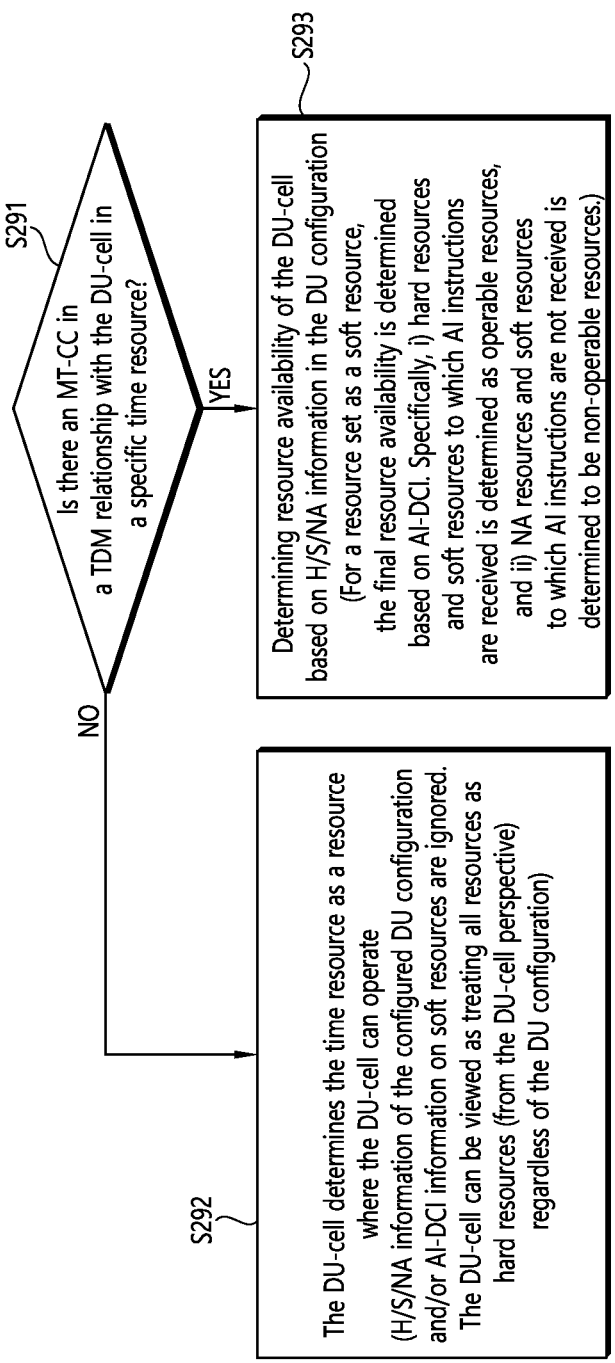
FIG. 29 illustrates a method of determining an operable resource differently according to the TDM/no-TDM relationship between the DU-cell and the MT-CC in the IAB node.

FIG. 29 illustrates a method of determining an operable resource differently according to the TDM/no-TDM relationship between the DU-cell and the MT-CC in the IAB node.

Referring to FIG. 29, the IAB node determines whether there is an MT-CC in a TDM relationship with the DU-cell in a specific time resource (S291), if there is no MT-CC, the DU-cell determines the time resource as a resource where the DU-cell can operate (S292). Specifically, H/S/NA information of the configured DU configuration and/or AI-DCI information on soft resources are ignored. The DU-cell can be viewed as treating all resources as hard resources (from the DU-cell perspective) regardless of the DU configuration. If there is an MT-CC in a TDM relationship with the DU-cell in a specific time resource, resource availability of the DU-cell is determined based on H/S/NA information in the DU configuration (S293). Specifically, for a resource set as a soft resource, the final resource availability is determined based on AI-DCI. i) hard resources and soft resources to which AI instructions are received may be determined as operable resources, and ii) NA resources and soft resources to which AI instructions are not received may be determined to be non-operable resources.

Alt 3. The DU-cell determines that it is an operable resource in the hard resource based on the hard/soft/NA information in the DU configuration that it has set, and determines that it is a non-operable resource in the NA resource. In the soft resource, an operable resource is determined as in Alt 2 above.

A method for determining resource availability of a specific MT-CC within the IAB node may be as follows.

The MT-CC may determine its own operation resource in consideration of resource availability information of the DU-cell(s) in a TDM relationship with the MT-CC in a specific time resource.

For DU-cells in a TDM relationship with the MT-CC, when at least one DU-cell determines that the resource is operable by itself (DU-cell), the MT-CC determines the corresponding resource as a resource in which the MT-CC cannot operate. However, in this case, if the MT-CC does not affect the operation of the DU-cells (i.e., does not interfere with the transmission/reception operation of the DU), the MT-CC may be allowed to perform the transmission/reception operation on the corresponding resource.

For DU-cells in a TDM relationship with the MT-CC, if there is no DU-cell that determines the resource as an operable resource, the MT-CC determines the corresponding resource as a resource in which it (MT-CC) can operate.

For example, if DU-Cell1 and DU-Cell2 exist in the IAB node, from the point of view of MT-CC1 within the same IAB node, it operates as no-TDM in the DU-Tx/MT-Tx and DU-Rx/MT-Rx directions with DU-Cell1, and in the DU-Tx/MT-Rx and DU-Rx/MT-Tx directions, no-TDM may be used. In addition, from the viewpoint of MT-CC1, with DU-Cell2, it can operate in no-TDM in the Tx/Rx direction of all DUs and MTs. In this case, in a specific time resource, MT-CC1 may have a DL Rx direction, and both DU-Cell1 and DU-Cell2 may have a DL Tx direction. In this case, in the corresponding resource, MT-CC1 has a TDM relationship with DU-Cell1 and a no-TDM relationship with DU-Cell2. Therefore, in this case, MT-CC1 may determine its own operation resource in consideration of the operable resource of DU-cell1.

Or as another example, when DU-Cell1 and DU-Cell2 exist in the IAB node, From the point of view of MT-CC1 within the same IAB node, it operates as no-TDM with DU-Cell1 in the DU-Tx/MT-Tx and DU-Rx/MT-Rx directions, and in the DU-Tx/MT-Rx and DU-Rx/MT-Tx directions, no-TDM may be used. In addition, from the viewpoint of MT-CC1, it can operate in TDM with DU-Cell2 in the Tx/Rx direction of all DUs and MTs. In this case, in a specific time resource, MT-CC1 may have a DL Rx direction, and both DU-Cell1 and DU-Cell2 may have a DL Tx direction. In this case, MT-CC1 is in a TDM relationship with both DU-cell1 and DU-cell2 in the corresponding resource. Accordingly, MT-CC1 determines whether its own operation is possible based on whether DU-Cell1 and DU-Cell2 can operate in the corresponding time resource. For example, when both DU-Cell1 and DU-Cell2 do not operate in the corresponding resource, MT-CC1 may determine that it can operate.

When the MT-CC does not have a DU-cell in a TDM relationship with itself in a specific time resourcet (i.e., only a DU-cell in a no-TDM relationship exists), the MT-CC may determine the corresponding resource as a resource in which it can operate.

For example, when DU-Cell1 and DU-Cell2 exist in the IAB node, from the point of view of MT-CC1 within the same IAB node, it operates as no-TDM with DU-Cell1 in the DU-Tx/MT-Tx and DU-Rx/MT-Rx directions, and in the DU-Tx/MT-Rx and DU-Rx/MT-Tx directions, no-TDM may be used. In addition, from the viewpoint of MT-CC1, with DU-Cell2, it can operate in no-TDM in the Tx/Rx direction of all DUs and MTs. In this case, in a specific time resource, MT-CC1 may have a UL Tx direction, and both DU-Cell1 and DU-Cell2 may have a DL Tx direction. In this case, MT-CC1 is in a no-TDM relationship with both DU-Cell1 and DU-Cell2 in the corresponding resource. Accordingly, the MT-CC1 may determine the corresponding resource as a resource capable of operating it.

B.4. Multiplexing Capability of MT and DU

When MT and DU within a specific IAB node or a specific MT-CC and DU-CC pair within an IAB node can TDM, the corresponding MT-CC and DU-CC pair (or MT and DU) is capable of only TDM operation. On the other hand, when MT and DU within a specific IAB node or specific MT-CC and DU-CC within an IAB node are capable of SDM/FDM, the corresponding MT-CC and DU-CC pair (or MT and DU) may perform TDM operation or SDM/FDM operation. When the MT and DU in a specific IAB node or a specific MT-CC and DU-CC pair in the IAB node can perform FD operation, the corresponding MT-CC and DU-CC pair (or MT and DU) may perform TDM operation, SDM/FDM operation, or FD operation.

In this case, multiplexing capability information may be reported to the network (e.g., to the parent-DU) for each MT and DU within a specific IAB node or for each specific MT-CC and DU-CC pair within the IAB node. For example, information on which multiplexing is possible among a) TDM, b) SDM/FDM, and c) FD between MT and DU or for each MT-CC and DU-CC pair may be reported.

In this case, the IAB node may assume that the multiplexing capability reported by the IAB node is applied to the MT and the DU or to the MT-CC and the DU-CC pair as it is.

Alternatively, based on the multiplexing capability information reported by the IAB node or independently, the IAB node may receive a multiplexing type applied to it from the network. At this time, for example, the network may configure one multiplexing type of a) TDM or b) SDM/FDM, c) FD for MT and DU or MT-CC and DU-CC pair reporting FD as multiplexing capability. For MT and DU or MT-CC and DU-CC pair reporting SDM/FDM as multiplexing capability, one multiplexing type of a) TDM or b) SDM/FDM can be configured. For MT and DU or MT-CC and DU-CC pair reporting TDM as multiplexing capability, a) only the multiplexing type of TDM can be configured. In this case, if the IAB node does not additionally configure the multiplexing type from the network, it may be assumed that the multiplexing capability reported by the IAB node is applied to the MT and the DU or the MT-CC and the DU-CC pair.

Alternatively, if the IAB node is not configured with a multiplexing type from the network, it may be assumed that the multiplexing capability reported by the IAB node is applied to the MT and the DU or the MT-CC and the DU-CC pair. At this time, when it is necessary to apply a multiplexing type different from the multiplexing capability reported by the IAB node, the network may set the multiplexing type to the IAB node. In this case, for example, the network may configure one multiplexing type of a) TDM or b) SDM/FDM for MT and DU or MT-CC and DU-CC pair reporting FD as multiplexing capability. For MT and DU or MT-CC and DU-CC pair reporting SDM/FDM as multiplexing capability, a) TDM multiplexing type can be configured. A separate configuration is not required for the MT and DU or MT-CC and DU-CC pair reporting TDM as multiplexing capability.

B.5. Maximum CC Capability for MT and DU

When a plurality of CCs may exist in the MT and the DU, capability information on the maximum number of CCs of the IAB node may be requested. The IAB node may report capability information about its maximum number of CCs to the network. The network may allocate a plurality of CCs to the IAB node so as not to exceed the capability of the IAB node based on the capability information on the maximum number of CCs of the IAB node.

Capability information on the maximum number of CCs of the IAB node may be as follows.

Alt 1. The maximum number of CCs may mean the total number of possible maximum CCs by adding the MTs CC and the DU's CC in the IAB node. In this case, there is one maximum CC number value per IAB node, which may mean the maximum value of the total number of CCs present in the MT and the DU.

Alt 2. The maximum number of CCs may mean the maximum number of CCs of the MT and the maximum number of CCs of the DU in the IAB node. That is, the maximum CC number value may exist independently for each of the MT and DU of the IAB node.

In this case, the capability for the maximum number of CCs of the IAB node may be defined differently depending on the situation. For example, it may be interpreted as one of Alt 1 and Alt 2 depending on the situation. Specifically, it may be as follows.

Alt a. When the IAB node reports the capability information on the maximum number of CCs to the network, it can also inform whether the capability information corresponds to Alt 1 or Alt 2.

Alt b. When the IAB node reports the capability information for the maximum number of CCs to the network, if one value is reported, the value means the total number of possible maximum CCs by adding the CC of the MT and the CC of the DU corresponding to Alt 1, and when two values are reported, the corresponding values may mean the maximum number of CCs of the MT and the maximum number of CCs of the DU, respectively, corresponding to Alt 2.

Figure 30:
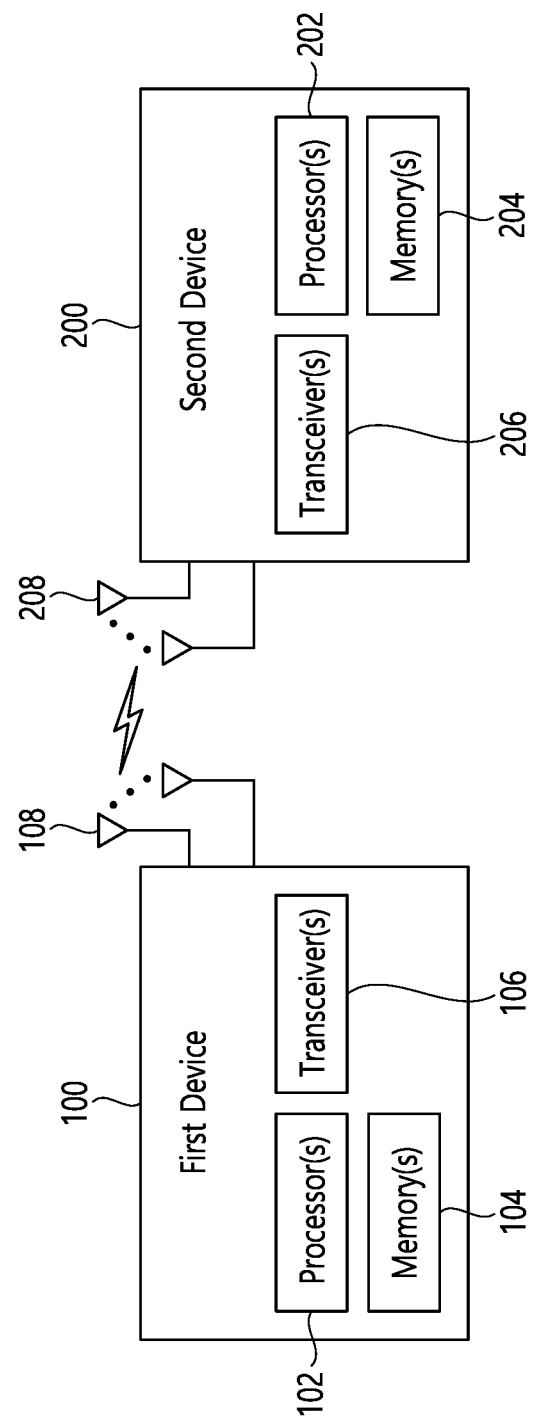
FIG. 30 illustrates an example of a wireless communication device for implementing the present disclosure.

FIG. 30 illustrates a wireless device applicable to the present specification.

Referring to FIG. 30, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processory 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present specification, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The one or more processors 102 and 202 may be implemented with at least one computer readable medium (CRM) including instructions to be executed by at least one processor.

That is, at least one computer readable medium (CRM) having an instruction to be executed by at least one processor to perform operations includes, in the IAB node including the DU and the MT, receiving first resource direction information for the DU, the first resource direction information informing a direction of each of resources as a downlink, an uplink, or a flexible, receiving second resource direction information for the MT, the second resource direction information informing a direction of each of the resources as a downlink, an uplink, or a flexible and for a specific resource among the resources, determining whether the DU and the MT can simultaneously operate based on a direction informed by the first resource direction information and a direction informed by the second resource direction information.

The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 31:
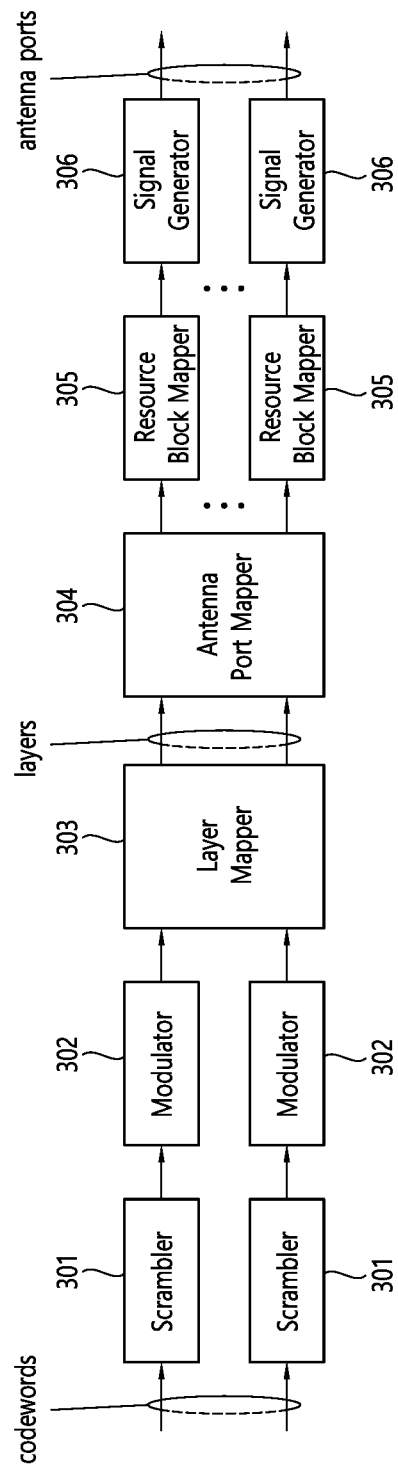
FIG. 31 shows an example of the structure of a signal processing module.

FIG. 31 shows an example of a structure of a signal processing module. Herein, signal processing may be performed in the processors 102 and 202 of FIG. 30.

Referring to FIG. 31, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 32:
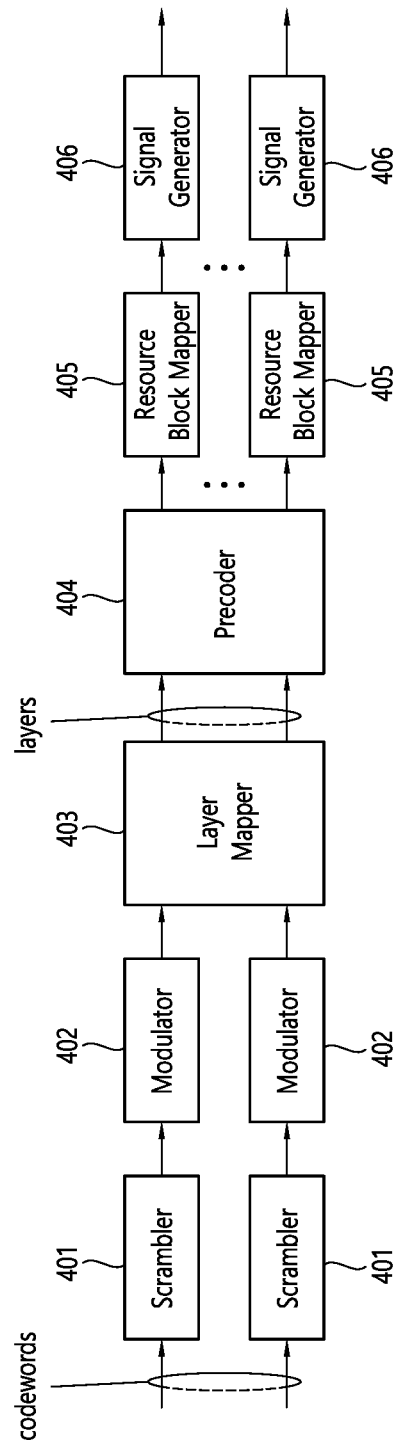
FIG. 32 shows another example of the structure of a signal processing module in a transmission device.

FIG. 32 shows another example of a structure of a signal processing module in a transmitting device. Herein, signal processing may be performed in a processor of a UE/BS, such as the processors 102 and 202 of FIG. 30.

Referring to FIG. 32, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 33:
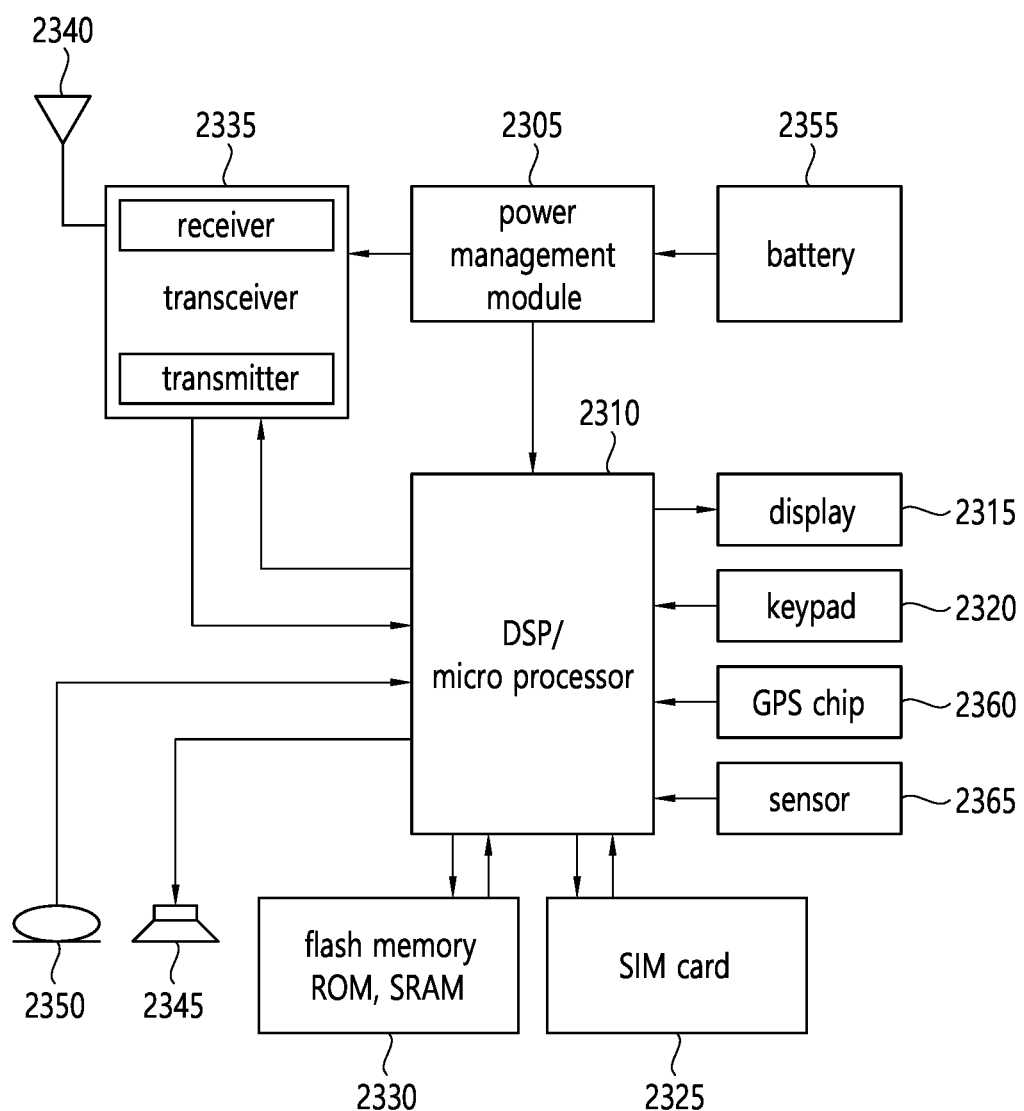
FIG. 33 illustrates an example of a wireless communication device according to an embodiment of the present disclosure.

FIG. 33 illustrates an example of a wireless communication device according to an implementation example of the present disclosure.

Referring to FIG. 33, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 33 may be the processors 102 and 202 in FIG. 30.

The memory 2330 is connected to the processor 2310 and stores information related to operations of the processor. The memory may be located inside or outside the processor and connected to the processor through various techniques such as wired connection and wireless connection. The memory 2330 in FIG. 33 may be the memories 104 and 204 in FIG. 30.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 33 may be the transceivers 106 and 206 in FIG. 30.

Although not shown in FIG. 33, various components such as a camera and a universal serial bus (USB) port may be additionally included in the UE. For example, the camera may be connected to the processor 2310.

FIG. 33 is an example of implementation with respect to the UE and implementation examples of the present disclosure are not limited thereto. The UE need not essentially include all the components shown in FIG. 33. That is, some of the components, for example, the keypad 2320, the GPS chip 2360, the sensor 2365 and the SIM card 2325 may not be essential components. In this case, they may not be included in the UE.

Figure 34:
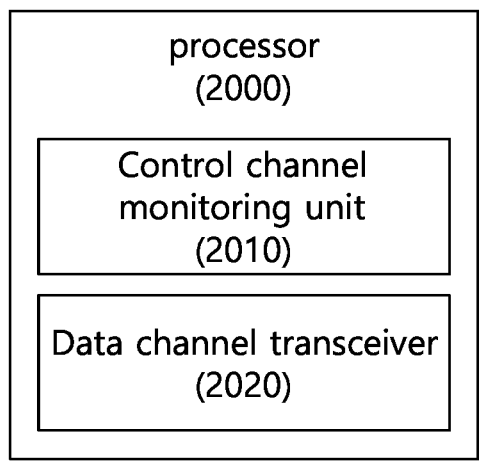
FIG. 34 shows an example of a processor 2000.

FIG. 34 shows an example of a processor 2000.

Referring to FIG. 34, the processor 2000 may include a control channel monitoring unit 2010 and a data channel transceiver 2020. The processor 2000 may execute the methods described in FIG. 22 to FIG. 29 (from a perspective of a receiver). For example, the processor 2000 (more specifically, the control channel monitoring unit 2010) may receive the first resource direction information for the DU of the IAB node, and receive the second resource direction information for the MT. The data channel transceiver 2020 determines whether the DU and the MT can simultaneously operate for a specific resource based on a direction indicated by the first resource direction information and a direction indicated by the second resource direction information for a specific resource and an operation can be performed accordingly. The processor 2000 may be an example of the processors 102 and 202 of FIG. 30.

Figure 35:
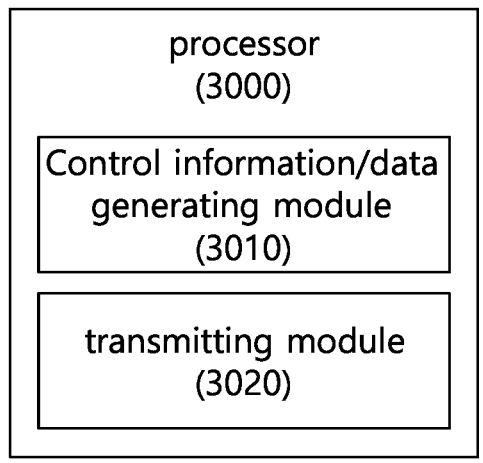
FIG. 35 shows an example of a processor 3000.

FIG. 35 shows an example of a processor 3000.

Referring to FIG. 35, the processor 3000 may include a control information/data generating module 3010 and a transmitting module 3020. The processor 3000 may execute the methods described in FIG. 22 to FIG. 29 (from a perspective of a transmitter). For example, the processor 3000 may transmit first resource direction information for the DU of the IAB node to the IAB node, and transmit second resource direction information for the MT of the IAB node to the IAB node. Communication with the IAB node may be performed considering a resource that is determined to be a resource capable of simultaneously operating the DU and the MT based on the first resource direction information and the second resource direction information. The processor 3000 may be an example of the processors 102 and 202 of FIG. 30.

Figure 36:
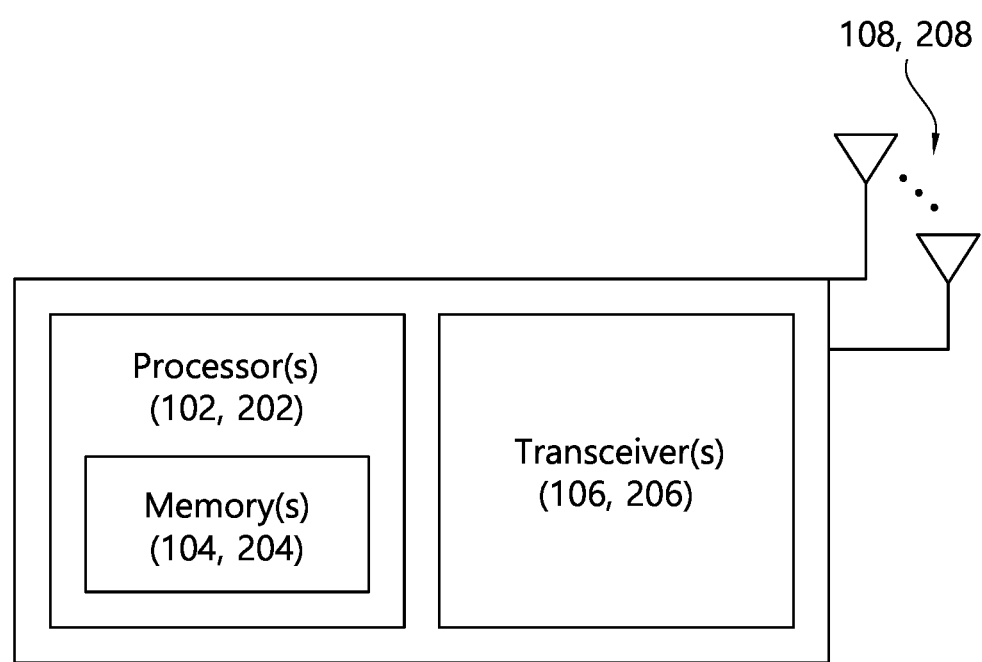
FIG. 36 shows another example of a wireless device.

FIG. 36 shows another example of a wireless device.

Referring to FIG. 36, the wireless device may include one or more processors 102 and 202, one or more memories 104 and 204, and one or more transceivers 108 and 208.

The example of the wireless device described in FIG. 36 is different from the example of the wireless described in FIG. 30 in that the processors 102 and 202 and the memories 104 and 204 are separated in FIG. 30 whereas the memories 104 and 204 are included in the processors 102 and 202 in the example of FIG. 36. That is, the processor and the memory may constitute one chipset.

Figure 37:
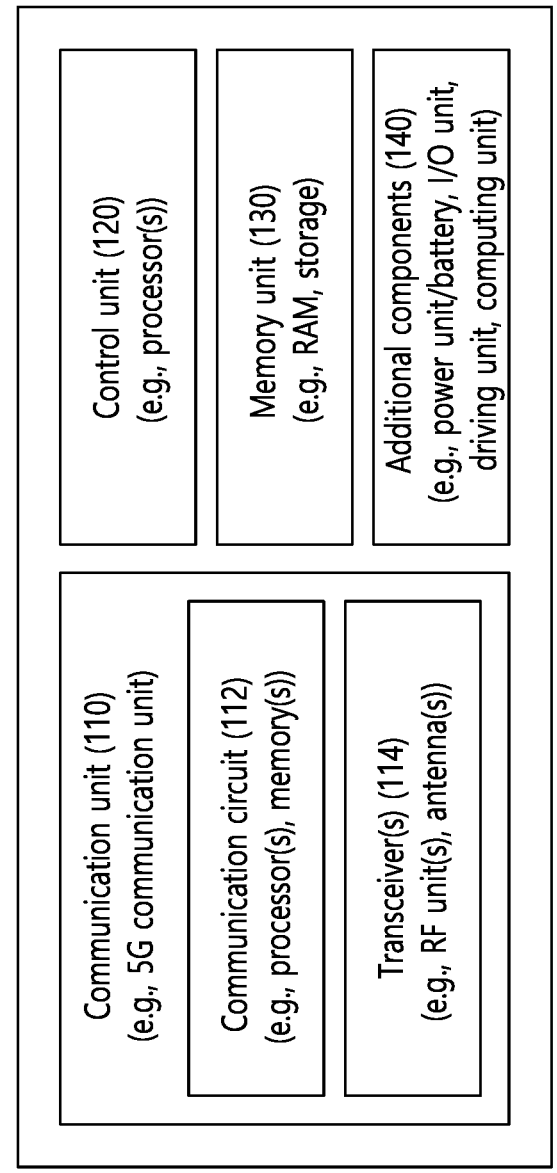
FIG. 37 shows another example of a wireless device applied to the present specification.

FIG. 37 shows another example of a wireless device applied to the present specification. The wireless device may be implemented in various forms according to a use-case/service.

Referring to FIG. 37, wireless devices 100 and 200 may correspond to the wireless devices 100 and 200 of FIG. 30 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208 of FIG. 30. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 37), the vehicles (100*b*-1 and 100*b*-2 of FIG. 37), the XR device (100*c* of FIG. 37), the hand-held device (100*d* of FIG. 37), the home appliance (100*e* of FIG. 37), the IoT device (100*f* of FIG. 37), a digital broadcast UE, a hologram device, a public safety device, an MTC device, a medicine device, a fintech device (or a finance device), a security device, a climate/environment device, the AI server/device (400 of FIG. 37), the BSs (200 of FIG. 37), a network node, etc. The wireless device may be used in a mobile or fixed place according to a use-example/service.

In FIG. 37, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. In addition, each element, component, unit/portion, and/or module within the wireless devices 100 and 200 may further include one or more elements. For example, the control unit 120 may be configured by a set of one or more processors. For example, the control unit 120 may be configured by a set of a communication control processor, an application processor, an Electronic Control Unit (ECU), a graphical processing unit, and a memory control processor. For another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 38:
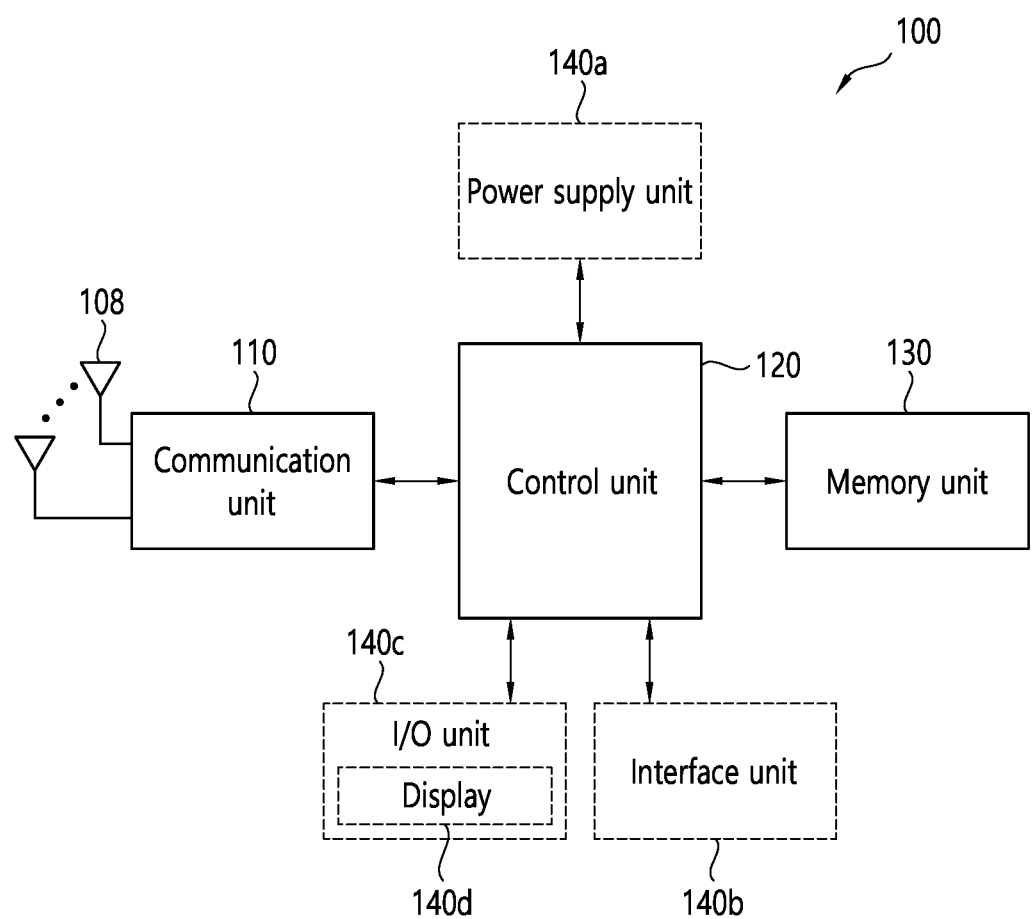
FIG. 38 illustrates a hand-held device applied to the present specification.

FIG. 38 illustrates a hand-held device applied to the present specification. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 38, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* respective correspond to the blocks 110 to 130/140 of FIG. 37.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

For example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 39:
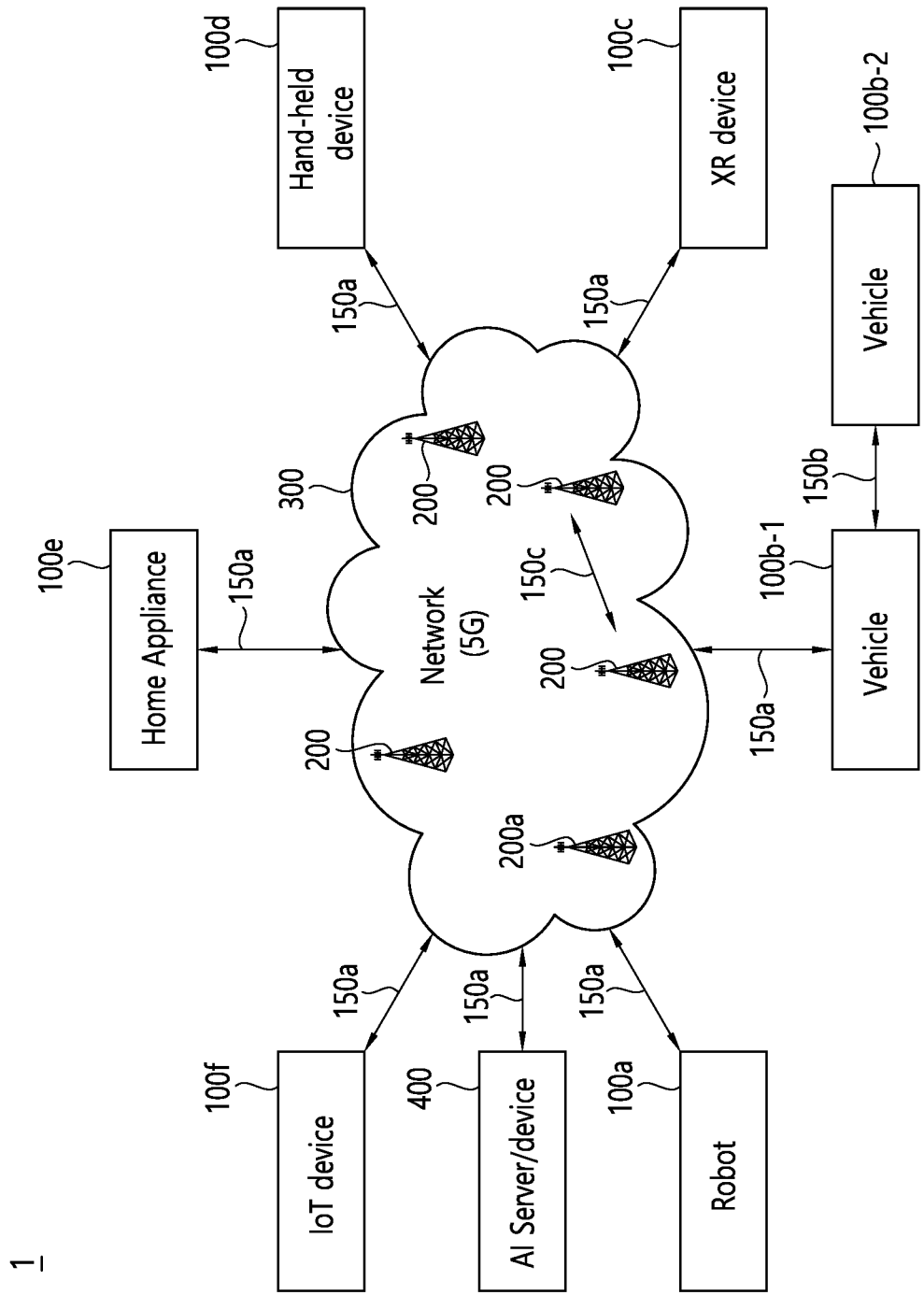
FIG. 39 illustrates a communication system 1 applied to the present specification.

FIG. 39 illustrates a communication system 1 applied to the present specification.

Referring to FIG. 39, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 5. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 5

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 6 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 6

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 40:
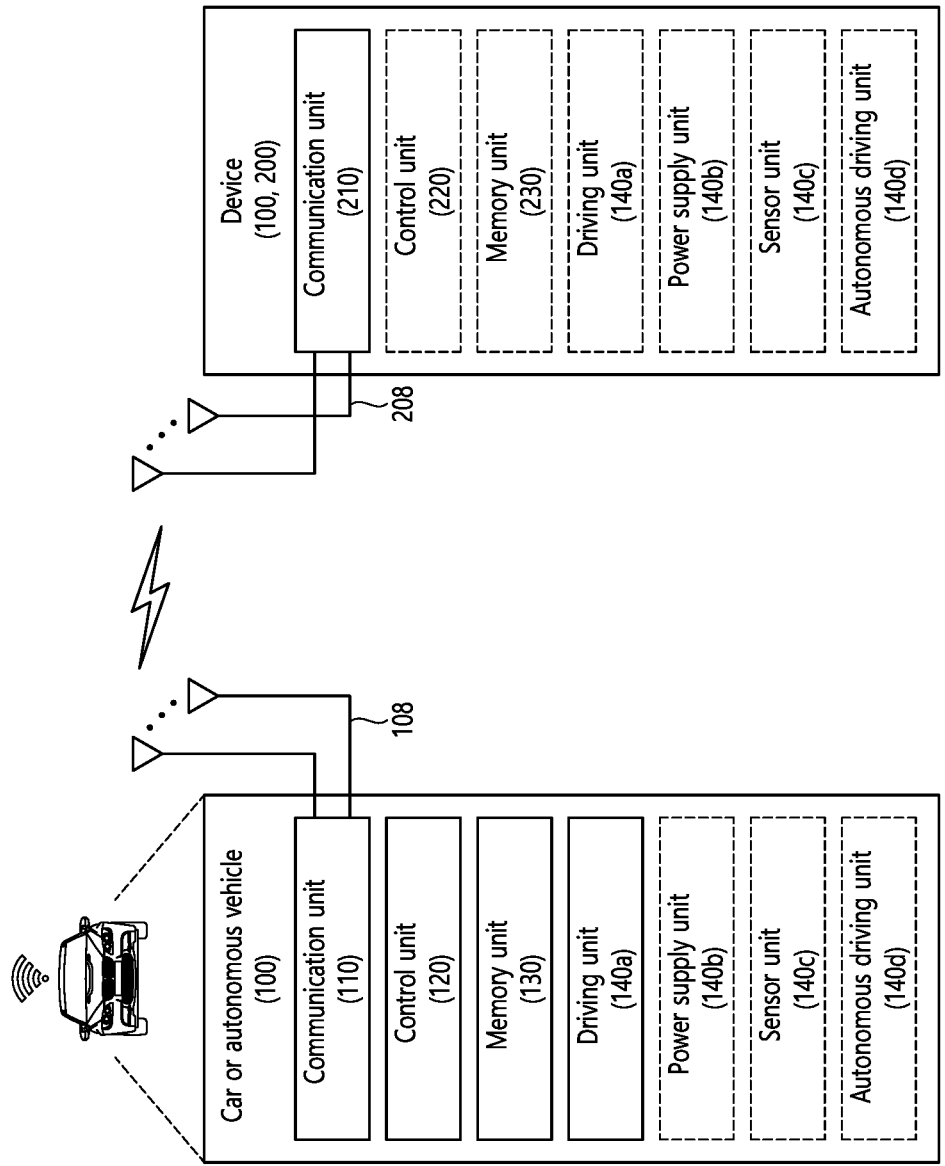
FIG. 40 illustrates a vehicle or an autonomous vehicle applicable to the present specification.

FIG. 40 illustrates a vehicle or an autonomous vehicle applicable to the present specification. The vehicle or autonomous vehicle may be implemented by a mobile robot, a car, a train, a manned/unmanned Aerial Vehicle (AV), a ship, etc.

Referring to FIG. 40, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d respectively correspond to the blocks 110/130/140 of FIG. 37.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method of operating an integrated access and backhaul (IAB) node including a distributed unit (DU) and a mobile terminal (MT) in a wireless communication system, the method comprising:
receiving first resource direction information for the DU, wherein the first resource direction information informs the IAB node of a direction for each of a number of resources as downlink, uplink, or flexible;
receiving resource attribute information for the DU, wherein the resource attribute information informs the IAB node whether each of the resources is hard, soft, or unavailable (NA);
receiving second resource direction information for the MT, wherein the second resource direction information informs the IAB node of a direction for each of the resources as downlink, uplink, or flexible; and
for a specific resource among the resources, determining whether the DU and the MT can simultaneously operate based on the direction of the specific resource in the first resource direction information and on the direction of the specific resource in the second resource direction information,
wherein irrespective of whether the specific resource is hard, soft or unavailable, based on the direction of the specific resource in the first resource direction information and the direction of the specific resource in the second resource direction information being predetermined specific directions, determining that the DU and the MT can simultaneously operate in the specific resource.

2. The method of claim 1, wherein based on the specific resource being hard and the direction of the specific resource in the first resource direction information and the direction of the specific resource in the second resource direction information not being predetermined specific directions, determining that only the DU is operable in the specific resource.

3. The method of claim 1, wherein based on the specific resource being soft and the specific resource being usable by the DU, and the direction of the specific resource in the first resource direction information and the direction of the specific resource in the second resource direction information not being predetermined specific directions, determining that only the DU is operable in the specific resource.

4. The method of claim 1, wherein based on the specific resource being soft and the specific resource not being usable by the DU, and the direction of the specific resource in the first resource direction information and the direction of the specific resource in the second resource direction information not being predetermined specific directions, determining that the DU is operable when the MT does not operate in the specific resource.

5. The method of claim 1, wherein based on the specific resource being unavailable (NA) and the direction of the specific resource in the first resource direction information and the direction of the specific resource in the second resource direction information not being predetermined specific directions, determining that only the MT is operable in the specific resource.

6. The method of claim 1, wherein a resource that is flexible based on the first resource direction information is a resource in which the DU and the MT cannot simultaneously operate.

7. An integrated access and backhaul (IAB) node including a distributed unit (DU) and a mobile terminal (MT), the IAB node comprising:
at least one transceiver;
at least one memory; and
at least one processor operatively coupled with the at least one memory and the at least one transceiver, wherein the at least one memory stores instructions that, based on being executed by the at least one processor, cause the at least one processor to perform operations comprising:
receiving first resource direction information for the DU, wherein the first resource direction information the IAB node of a direction for each of a number of resources as downlink, uplink, or flexible;
receiving resource attribute information for the DU, wherein the resource attribute information informs the IAB node whether each of the resources is hard, soft, or unavailable (NA);
receiving second resource direction information for the MT, wherein the second resource direction information informs the IAB node of a direction for each of the resources as downlink, uplink, or flexible; and
for a specific resource among the resources, determining whether the DU and the MT can simultaneously operate based on the direction of the specific resource in the first resource direction information and on the direction of the specific resource in the second resource direction information,
wherein irrespective of whether the specific resource is hard, soft or unavailable, based on the direction of the specific resource in the first resource direction information and the direction of the specific resource in the second resource direction information being predetermined specific directions, determining that the DU and the MT can simultaneously operate in the specific resource.

8. The IAB node of claim 7, wherein based on the specific resource being hard and the direction of the specific resource in the first resource direction information and the direction of the specific resource in the second resource direction information not being predetermined specific directions, determining that only the DU is operable in the specific resource.

9. The IAB node of claim 7, wherein based on the specific resource being soft and the specific resource being usable by the DU, and the direction of the specific resource in the first resource direction information and the direction of the specific resource in the second resource direction information not being predetermined specific directions, determining that only the DU is operable in the specific resource.

10. The IAB node of claim 7, wherein based on the specific resource being soft and the specific resource not being usable by the DU, and the direction of the specific resource in the first resource direction information and the direction of the specific resource in the second resource direction information not being predetermined specific directions, determining that the DU is operable when the MT does not operate in the specific resource.

11. The IAB node of claim 7, wherein based on the specific resource being unavailable (NA) and the direction of the specific resource in the first resource direction information and the direction of the specific resource in the second resource direction information not being predetermined specific directions, determining that only the MT is operable in the specific resource.

12. The IAB node of claim 7, wherein a resource that is flexible based on the first resource direction information is a resource in which the DU and the MT cannot simultaneously operate.

* * * * *